(12) United States Patent
Kondo et al.

(10) Patent No.: US 6,280,329 B1
(45) Date of Patent: Aug. 28, 2001

(54) VIDEO GAME APPARATUS OUTPUTTING IMAGE AND MUSIC AND STORAGE MEDIUM USED THEREFOR

(75) Inventors: Koji Kondo; Yoji Inagaki; Hideaki Shimizu, all of Kyoto (JP)

(73) Assignee: Nintendo Co., Ltd., Higashiyama-ku (JP)

( * ) Notice: Subject to any disclaimer, the term of this patent is extended or adjusted under 35 U.S.C. 154(b) by 0 days.

(21) Appl. No.: 09/318,619

(22) Filed: May 26, 1999

(51) Int. Cl.[7] ....................................... A63F 9/24
(52) U.S. Cl. ................................. 463/43; 463/1
(58) Field of Search .................. 463/1, 31, 32, 463/33, 35, 43

(56) References Cited

U.S. PATENT DOCUMENTS

| | | | |
|---|---|---|---|
| 5,393,071 | * | 2/1995 | Best ........................................ 273/434 |
| 5,680,534 | * | 10/1997 | Yamato et al. ........................ 395/173 |
| 5,862,229 | * | 1/1999 | Shimizu .................................. 381/17 |
| 5,867,175 | * | 2/1999 | Katzenberger et al. ............. 345/473 |

* cited by examiner

Primary Examiner—Jessica J. Harrison
Assistant Examiner—Kim T. Nguyen
(74) Attorney, Agent, or Firm—Nixon & Vanderhye P.C.

(57) ABSTRACT

A video game apparatus includes an external ROM. This external ROM has a sound memory area memorized with sound sequence data. The sound sequence data includes a plurality of block sequences for each of three status of "move", "fight" and "stop" of a player object. A CPU detects a status of the player object according to a mode flag, and read to a RAM a block sequence in compliance with the status detected. It is possible to output a series of game melodies in a manner matched to the status of the player object by the repetition of using the plurality of block sequences.

24 Claims, 27 Drawing Sheets

F I G. 3
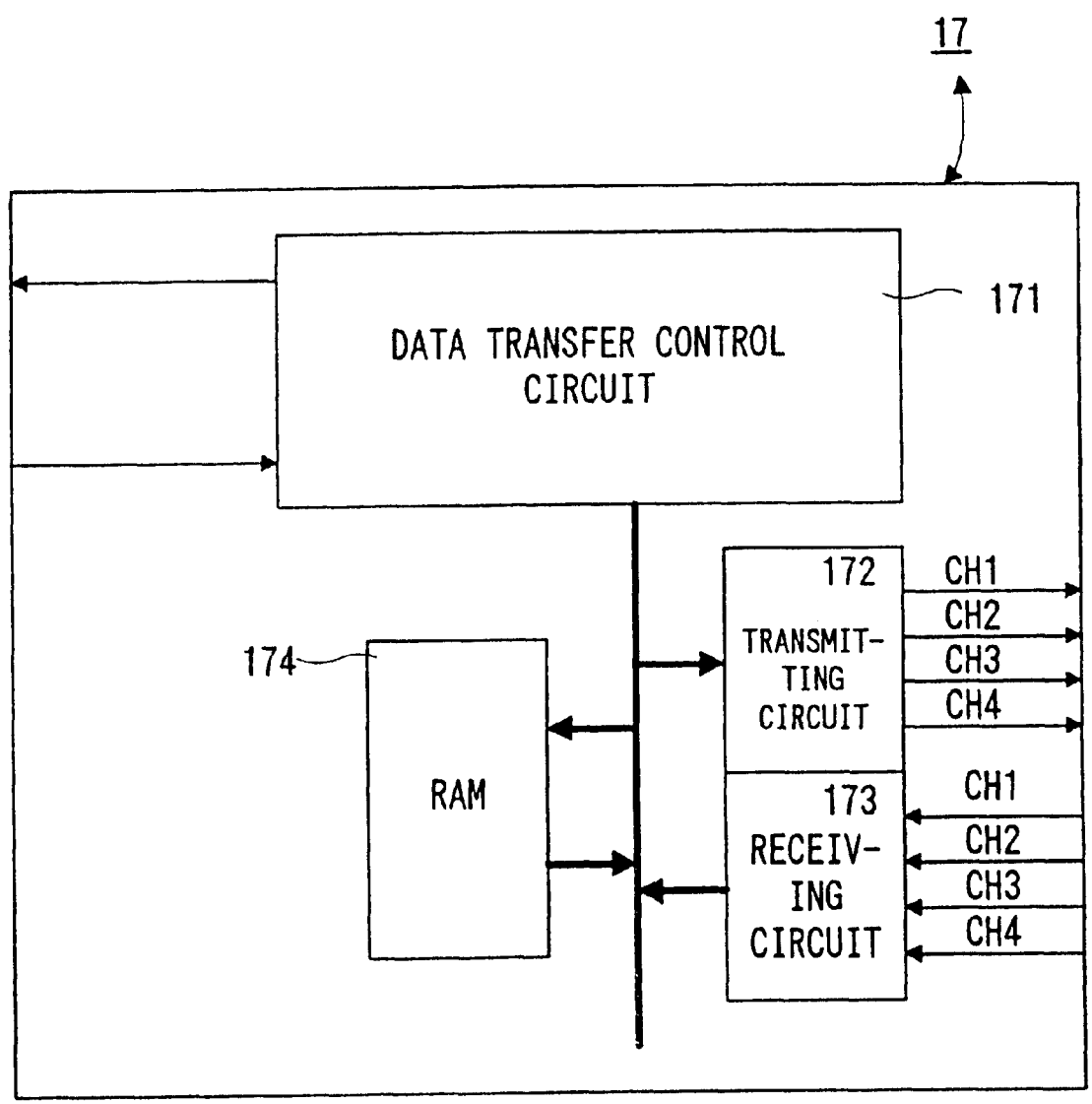

FIG. 6

CONTENTS OF SOUND DATA SEQUENCE IN ROM 21

| SEQUENCE NUMBER | SEQUENCE NAME |
| --- | --- |
| 0 | BLOCK SUPERVISING SEQUENCE |
| 1 | MOVEMENT BLOCK SEQUENCE · INTRODUCTION |
| 2 | MOVEMENT BLOCK SEQUENCE 1 |
| 3 | MOVEMENT BLOCK SEQUENCE 2 |
| 4 | MOVEMENT BLOCK SEQUENCE 3 |
| 5 | MOVEMENT BLOCK SEQUENCE 4 |
| 6 | FIGHT BLOCK SEQUENCE · INTRODUCTION |
| 7 | FIGHT BLOCK SEQUENCE 1 |
| 8 | FIGHT BLOCK SEQUENCE 2 |
| 9 | STOP BLOCK SEQUENCE · INTRODUCTION |
| 10 | STOP BLOCK SEQUENCE 1 |
| 11 | STOP BLOCK SEQUENCE 2 |

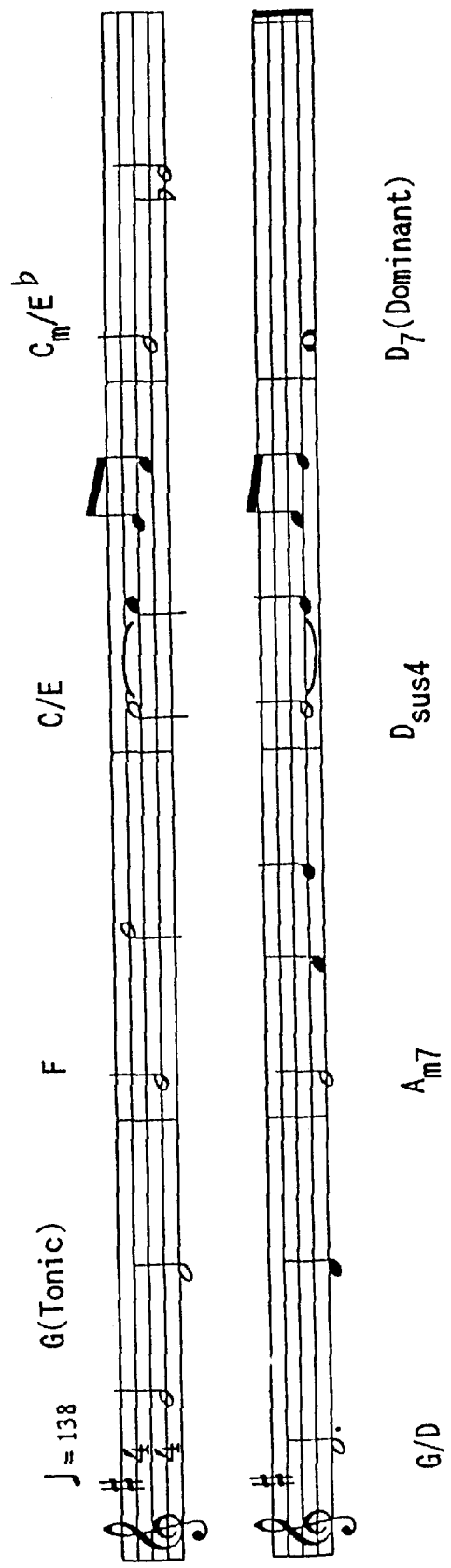

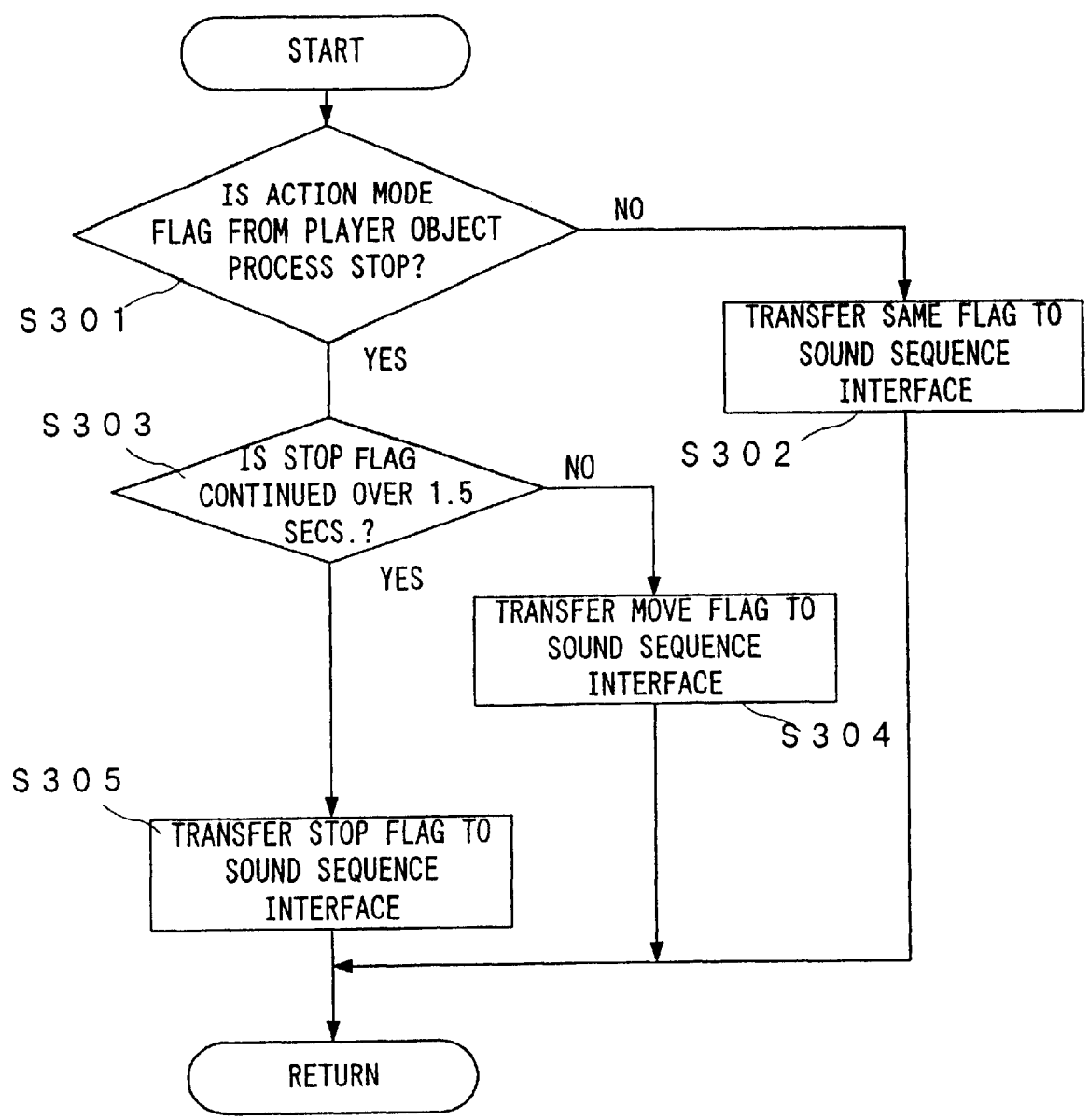

PLAYER OBJECT

BLOCK SEQUENCES

FIG. 17

VIDEO GAME APPARATUS OUTPUTTING IMAGE AND MUSIC AND STORAGE MEDIUM USED THEREFOR

BACKGROUND OF THE INVENTION

1. Field of the Invention

The present invention relates to video game apparatuses. More particularly, the invention relates to a video game apparatus which displays on a display screen video images of game characters, such as a player object, enemy objects, background objects, etc. while simultaneously outputting a game melody through a speaker or earphone in a manner related to the change of an image, and a memory medium usable on such an apparatus.

2. Description of the Prior Art

For the video game apparatuses of this kind, there have been two conventional methods to output game melodies. One method is to output a series of game melodies continuously in a monotonous fashion, without being exactly related to the change of image. In the other method, a game melody having been played so far is halted upon the occurrence of a major event in order to start a new game melody that is quite different from the preceding one but well suited for that event.

In the former method, there is less of a relationship between the game image and the game melody. Such an insufficient relationship lessens the game's feel of realism. In the latter method, when the change of game image is minor in degree, no change in the game music is provided. Only when a major change is caused in the game image, a new game melody different from the preceded one is abruptly outputted without consideration for musical continuity. Thus, a feeling that the music is mismatched with the game image is induced.

In order to eliminate the above drawbacks preparing a great amount of melody data is required. Such data must be properly mixed and outputted as a game melody in a manner so that the user doesn't become tired of the melody. However, the preparation of such a large amount of melody data naturally results in a new problem, i.e., the RAM requires an increased capacity of memory to read in data when outputting a game melody.

SUMMARY OF THE INVENTION

Therefore, it is a primary object of the present invention to provide a novel video game apparatus for outputting game images together with game music.

It is another object of the present invention to provide a video game apparatus which has a minimal amount of memory capacity but which is capable of outputting a game melody in a manner matched to the game image.

A video game apparatus according to the present invention displays on a display, according to a game program, game images including a player object and outputs a game melody in relation to the game images. The video game apparatus comprises: a memory medium for fixedly storing the game program, the memory medium storing a plurality of block sequences to constitute a game melody each of which consists of a plurality of measures, each of the plurality of block sequences having head and last measures having been set to provide a continuation of music between two arbitrary block sequences combined in continuation. The apparatus also comprises: a RAM; a selecting means for selecting at least one by one the plurality of block sequences; a read means for reading one or more selected block sequences to the RAM; and an output means for outputting a game melody based on the block sequences read in the RAM, the read means selecting a block sequence before ending a block sequence being outputted by the outputting means.

A memory medium according to the present invention to be attached, upon use, to a video game apparatus which displays on a display, according to a game program, game images including a player object and outputs a game melody in relation to the game images, comprising: a first memory area for storing a plurality of block sequences to constitute the game melody each of which consists of a plurality of measures, each of the block sequences having head and last measures having been set to provide a continuation of music for two block sequences combined in continuation; a second memory area for storing a select program for selecting at least one of the block sequences one by one; a third memory area for storing a read program to read in a RAM one or more of the selected block sequences; and a fourth memory area for storing an output program to output a game melody based on the block sequences read in the RAM, a block sequence being selected according to the select program before ending a block sequence being outputted by the output program.

For example, the selecting means selects, for example, one of a plurality of block sequences with a predetermined timing related to an action state of the player object. The selected block sequence is read from the memory medium to the RAM. The output means output a game melody depending upon the block sequence read in the RAM. Before the block sequence being played ends, the selecting means selects another block sequence. By repeating such an operation, a series of game melodies are outputted by connecting the block sequences to one another.

According to the present invention, where a plurality of block sequences are previously set within a memory medium to output a game melody, the block sequences may be properly selected and read into the RAM. There is no necessity of reading a large amount of melody data onto the RAM when sounding a game melody. Accordingly, it is possible to output a game melody in a manner matched to game progression with a reduced RAM memory capacity.

In a preferred embodiment, the video game apparatus further comprises a state detecting means for detecting an action state of the player object, wherein the plurality of block sequences includes two or more state-basis block sequences for each different action state of the player object, the selecting means selecting one of the state-basis block sequences belonging to an action state detected by the state detecting means.

The action state of the player object includes at least "move" and "stop", the state detecting means detecting the "move" state when the "stop" state does not remain for a predetermined time period and longer. Consequently, where, for example, the player object happens to stop during movement, a block sequence of "move" is played instead of a block sequence of "stop".

The video game apparatus further comprises a state change detecting means for detecting a change in the action state of the player object, wherein each of the state-basis block sequences includes an introduction sequence, and when a state change is detected by the state change detecting means the selecting means selecting an introduction sequence for the state-basis sequence. That is, when a change of state occurs, a state-basis introduction sequence belonging to a changed action state is played.

In the embodiment, however, the introduction sequence of "move" is played at a beginning of a game melody. Thereafter, when a "move" state is entered from a "stop" or "fight" state, a block sequence other than the "move" state is selected without again playing the introduction sequence of the "move" state.

Where the state-basis block sequence includes three or more block sequences while the introduction sequences are included for each action state, the selecting means includes a random selecting means to select at random two or more block sequences except for the introduction sequences.

In another aspect of the present invention, a video game apparatus which displays on a display, according to a game program, game images including a player object and outputs a game melody in relation to the game images, comprises: a memory medium for fixedly storing the game program, the memory medium storing a plurality of block sequences to constitute a game melody each of which consists of a plurality of measures, each of the block sequences having head and last measures that provide a continuation of music for two arbitrary block sequences combined in continuation; and a game melody output means for outputting a series of game melodies by reading different ones of the block sequences out of the memory medium and connecting them depending upon predetermined condition related to the player object.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a block diagram showing in greater detail a controller control circuit of FIG. 2;

FIG. 6 is an illustrative view showing a content of sound sequences contained in a ROM of FIG. 5;

FIG. 8E is a musical notation showing one example of a move block sequence 4;

FIG. 9A is a musical notation showing one example of a fight block sequence introduction;

FIG. 9B is a musical notation showing one example of a fight block sequence 1;

FIG. 9C is a musical notation showing one example of a fight block sequence 2;

FIG. 10B is a musical notation showing one example of a stop block sequence 1;

FIG. 14 is a flowchart showing in detail an action mode flag process routine in the FIG. 12 embodiment;

FIG. 17 is a musical notation showing one part of a game melody to be outputted according to FIG. 16.

DETAILED DESCRIPTION OF THE PREFERRED EMBODIMENTS

Figure 1:
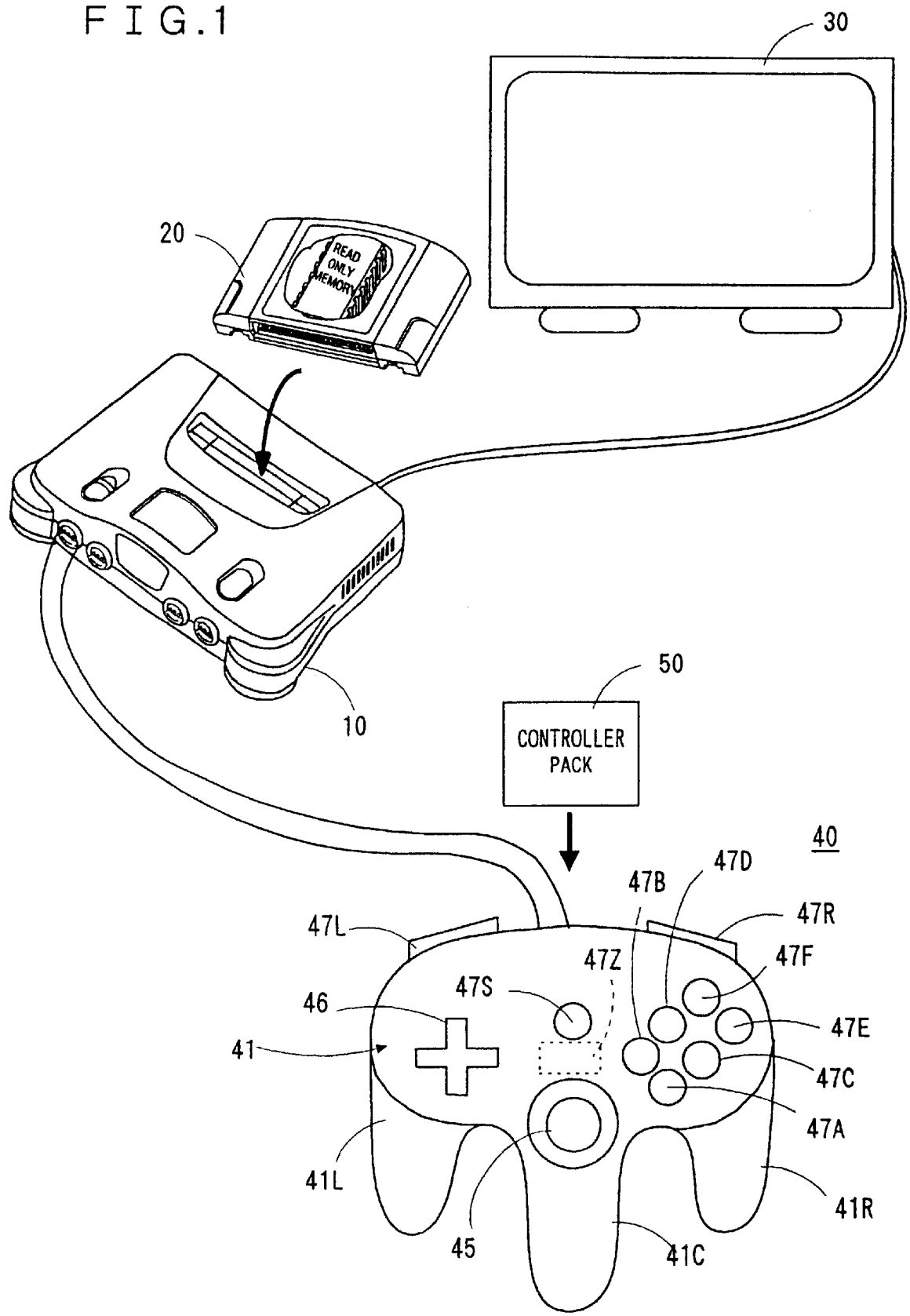
FIG. 1 is a schematic illustrative view showing a video game apparatus according to one embodiment of the present invention.

Referring to FIG. 1, a video game apparatus in this embodiment includes a video game machine 10, a ROM cartridge 20 as one example of a memory medium, a display unit 30 connected to the video game machine 10, and a controller 40. The controller 40 is dismountably mounted with a controller pack 50.

The controller 40 is structured by a plurality of switches or buttons provided on the housing 41 in a form graspable by both or one hand. Specifically, the controller 40 includes handles 41L, 41C, 41R downwardly extending respectively from a left end, a right end and a center of the housing 41, providing an operation area on a top surface of the housing 41. In the operation area, there are provided an analog-inputtable joystick (hereinafter referred to as "analog joystick") 45 at a central lower portion thereof, a cross-shaped digital direction switch (hereinafter called "cross switch") 46 on the left side, and a plurality of button switches 47A, 47B, 47D, 47E and 47F on the right side.

The analog joystick 45 is used to input a moving direction and/or moving speed or moving amount of the player object as determined by an amount and direction of joystick inclination. The cross switch 46 is used to designate a moving direction of the player object, in place of the joystick 45. The button switches 47A and 471B are used to designate a motion of the player object. Button switches 47C–47D are used to switch over a visual point of a three-dimension image camera or adjust speed or the like of the player object.

A start switch 47S is provided almost at a center of the operation area. This start switch 47S is operated when starting a game. A switch 47Z is provided at a backside of the central handle 41C. This switch 47Z is utilized, for example, as a trigger switch in a shoot game. Switches 47L and 47R are provided at the upper left and right of a lateral surface of the housing 41.

Incidentally, the above-stated button switches 47C–47F can also be used to control the moving speed (e.g. acceleration or deceleration) of the player object in a shooting or action game, besides for the purpose of switching the camera visual point. However, these switches 47A–47F, 47S, 47Z, 47L and 47R can be arbitrarily defined in their function depending upon a game program.

Figure 2:
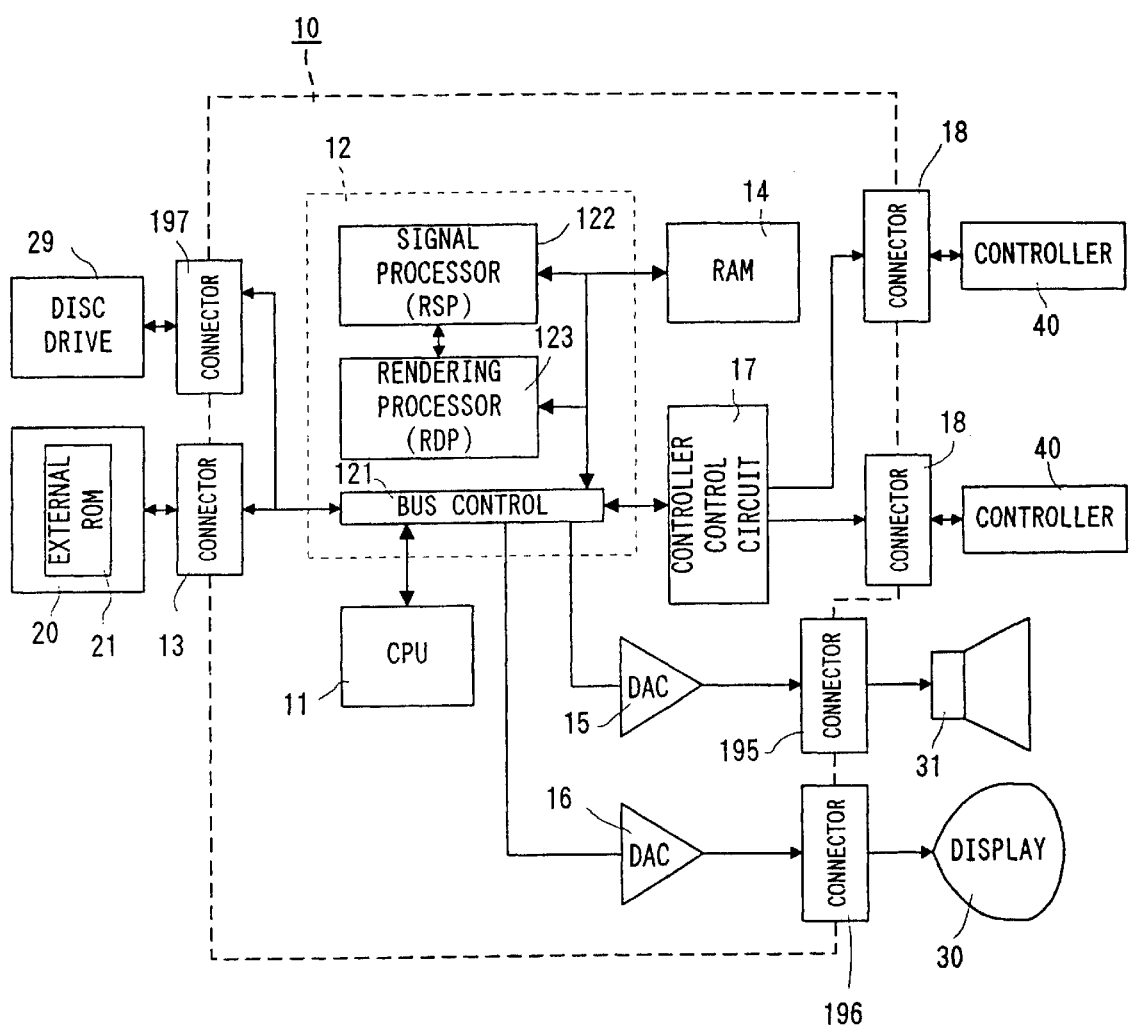
FIG. 2 is a block diagram showing in detail a video game machine in FIG. 1.

FIG. 2 is a block diagram of the video game system of the exemplary embodiment illustrated in FIG. 1. The video game machine 10 incorporates therein a central processing unit (hereinafter referred to as "CPU") 11 and a coprocessor (reality coprocessor: hereinafter referred to as "RCP") 12. The RCP 12 includes a bus control circuit 121 for controlling buses, a signal processor (reality signal processor; hereinafter referred to as "RSP") 122 for performing polygon coordinate transformation, shading treatment and so on, and a rendering processor (reality display processor; hereinafter referred to as "RDP") 123 for rasterizing polygon data into an image to be displayed and converting the same into a data form (dot data) which can be stored on a frame memory.

The RCP 12 is connected with a cartridge connector 13 for unloadably loading a ROM cartridge 20 having an external ROM 21 incorporated therein, a disc-drive connector 197 for detachably mounting a disc drive 29, and a RAM 14. Also, the RCP 12 is connected with DAC (Digital/Analog Converters) 15 and 16 for respectively outputting a sound signal and video signal to be processed by the CPU 11. Further, the RCP 12 is connected with a controller control circuit 17 to serially transfer operating data on one or a plurality of controllers 40 and/or vibration controller pack 50.

The bus control circuit 121 included in the RCP 12 performs parallel/serial conversion on a command supplied in a parallel signal from the CPU via a bus, to thereby supply a serial signal to the controller control circuit 18. Also, the bus control circuit 121 converts a serial signal inputted from the controller control circuit 17 into a parallel signal, giving an output to the CPU 11 via the bus. The data representative of an operating state (operating signal or operating data) read out of the controller 40 is processed by the CPU 11, and temporarily stored within a RAM 14, etc. In other words, the RAM 14 includes a storage site for temporarily storing the data to be processed by the CPU 11, so that it is utilized for smoothly reading and writing data through the bus control circuit 121.

The sound DAC 15 is connected with a connector 195 provided at a rear face of the video game machine 10. The video DAC 16 is connected with a connector 196 provided at the rear face of the video game machine 10. The connector 195 is connected with a speaker 31 of a display 30, while the connector 196 is connected with the display 30 such as a TV receiver or CRT.

The controller control circuit 17 is connected with a controller connector 18 provided at the front face of the video game machine 10. The connector 18 is disconnectably connected by a controller 40 through a connecting jack. The connection of the controller 40 to the connector 18 places the controller in electrical connection to the video game machine 10, thereby enabling transmission/reception or transfer of data therebetween.

The controller control circuit 17 is used to transmit and receive data in serial between the RCP 12 and the connector 15. The controller control circuit 17 includes, as shown in FIG. 3, a data transfer control circuit 171, a transmitting circuit 172, a receiving circuit 173 and a RAM 174 for temporarily storing transmission and reception data. The data transfer control circuit 171 includes a parallel/serial converting circuit and a serial/parallel converting circuit in order to convert a data format during data transfer, and further performs write/read control on the RAM 174. The serial/parallel converting circuit converts the serial data supplied from the RCP 12 into parallel data, supplying it to the RAM 174 or the transmitting circuit 172. The parallel/serial converting circuit converts the parallel data supplied from the RAM 174 or the receiving circuit 173 into serial data, to supply it to the RCP 12. The transmitting circuit 172 converts the command for reading signals from the controller 40 and the writing data (parallel data) to the controller pack 50, into serial data to be delivered to channels CH1–CH4 corresponding to the respective controllers 40. The receiving circuit 173 receives, in serial data, operational state data of the controllers inputted through corresponding channels CH1–CH4 and data read from the controller pack 50, to convert them into parallel data to be delivered to the data transfer control circuit 171. The data transfer control circuit 171 writes into the RAM 174 data transferred from the RCP 12, data of the controller received by the receiving circuit 173, or data read out of the RAM controller pack 50, and reads data out of the RAM 174 based on a command from the RCP 12 as to transfer it to the RCP 12.

The RAM 174 includes memory sites (not shown) for the respective channels CH1–CH4. Each of the memory sites stores a command for the channel, transmitting data and/or reception data.

Figure 4:
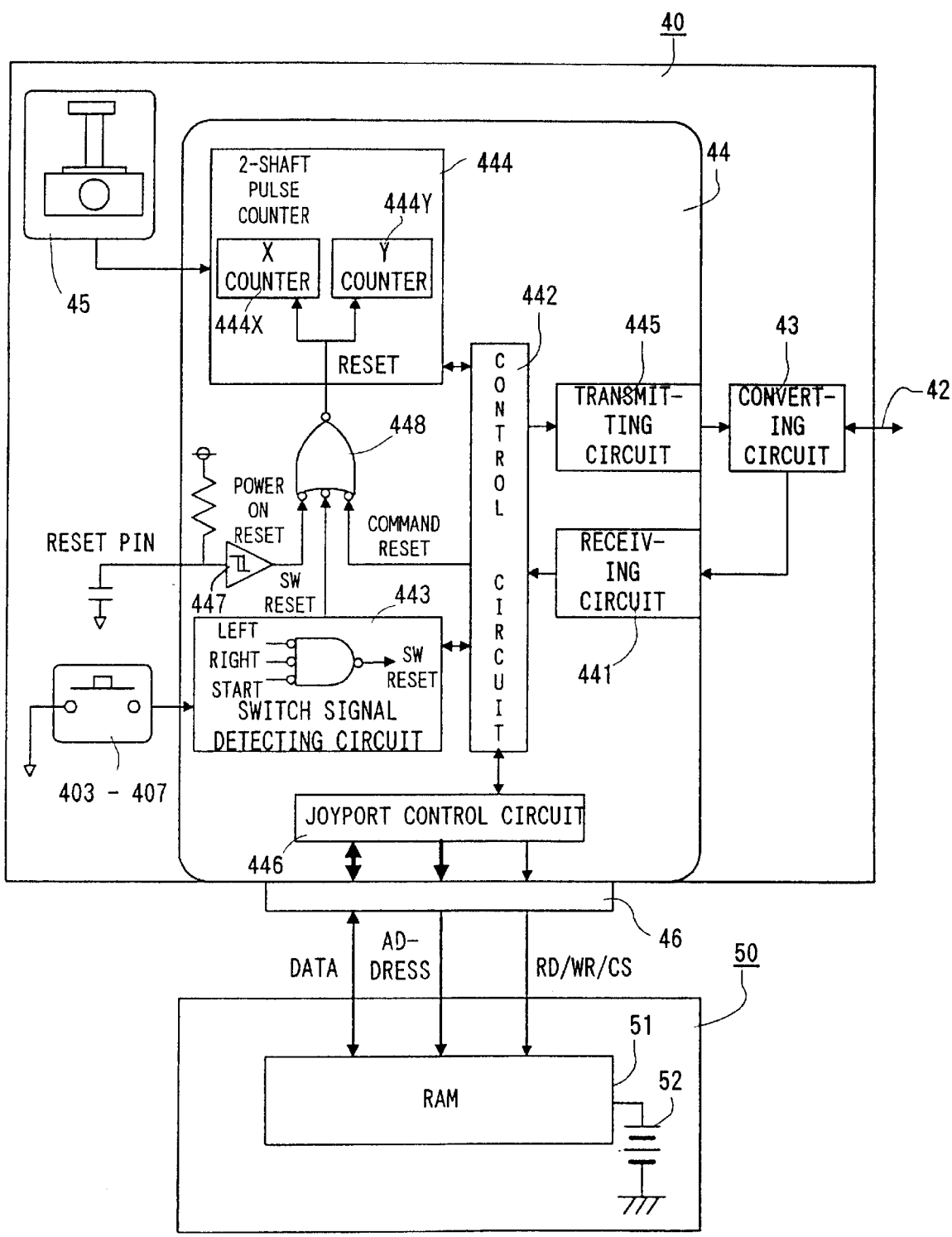
FIG. 4 is a block diagram showing in detail a controller and cartridge of FIG. 1.

FIG. 4 is a detailed circuit diagram of the controller 40 and the controller pack 50. The housing of the controller 40 incorporates an operating signal processing circuit 44, etc. in order to detect an operating state of the joystick 45, switches 46, 47, etc. and transfer the detected data to the controller control circuit 17. The operating signal processing circuit 44 includes a receiving circuit 441, a control circuit 442, a switch signal detecting circuit 443, a counter circuit 444, a joyport control circuit 446, a reset circuit 447 and a NOR gate 448. The receiving circuit 441 converts a serial signal, such as a control signal transmitted from the controller control circuit 17 or writing data to the controller pack 50, into a parallel signal to supply it to the control circuit 442. The control circuit 442 generates a reset signal to reset (0), through the NOR gate 448, count values of an X-axis counter 444X and a Y-axis counter 444Y within the counter 444, when the control signal transmitted from the controller control circuit 17 is a signal for resetting X, Y coordinates of the joystick 45.

The joystick 45 includes X-axis and Y-axis photointerrupters in order to decompose a lever inclination into X-axis and Y-axis components, generating pulses in number proportional to the inclination. The pulse signals are respectively supplied to the counter 444X and the counter 444Y. The counter 444X counts a number of pulses generated in response to an inclination amount when the joystick 45 is inclined in the X-axis direction. The counter 444Y counts a number of pulses generated responsive to an inclination amount when the joystick 45 is inclined in the Y-axis direction. Accordingly, the resultant X-axis and Y-axis vector determined by the count values of the counters 444X and 444Y serves to determine a moving direction and a coordinate position of the player object or hero character or a cursor. Incidentally, the counter 444X and the 444Y are reset when a reset signal is supplied from the reset signal generating circuit 447 upon turning on the power or a reset signal is supplied from the switch signal detecting circuit 443 by simultaneous depression of two predetermined switches.

The switch signal detecting circuit 443 responds to a switch-state output command supplied at an interval of a constant period (e.g., a 1/30 second interval as a TV frame period) from the control circuit 442, to read a signal which varies depending upon a depression state of the cross switch 46 and the switches 47A–47Z. The read signal is delivered to the control circuit 442. The control circuit 442 responds to a read-out command signal of operational state data from the controller control circuit 17 to supply in a predetermined data format the operational state data on the switches 47A-47Z and count values of the counters 444X and 444Y to the transmitting circuit 445. The transmitting circuit 445 converts the parallel signal outputted from the control circuit 442 into a serial signal, and transfers it to the controller control circuit 17 via a converting circuit 43 and a signal line 42. The control circuit 442 is connected with a joystick control circuit 446 via an address bus and a data bus as well as a port connector 46. The joyport control circuit 446 performs data input/output (or transmission/reception) control according to a command from the CPU 11 when the controller pack 50 is connected to the port connector 46.

The controller pack 50 is structured by connecting the RAM 51 to the address bus and the data bus and connecting the RAM 51 with a battery 52. The RAM 51 stores backup data in relation to a game, and saves backup data by the application of electric power from the battery 52 even if the controller pack 50 is withdrawn from the port connector 46.

Figure 5:
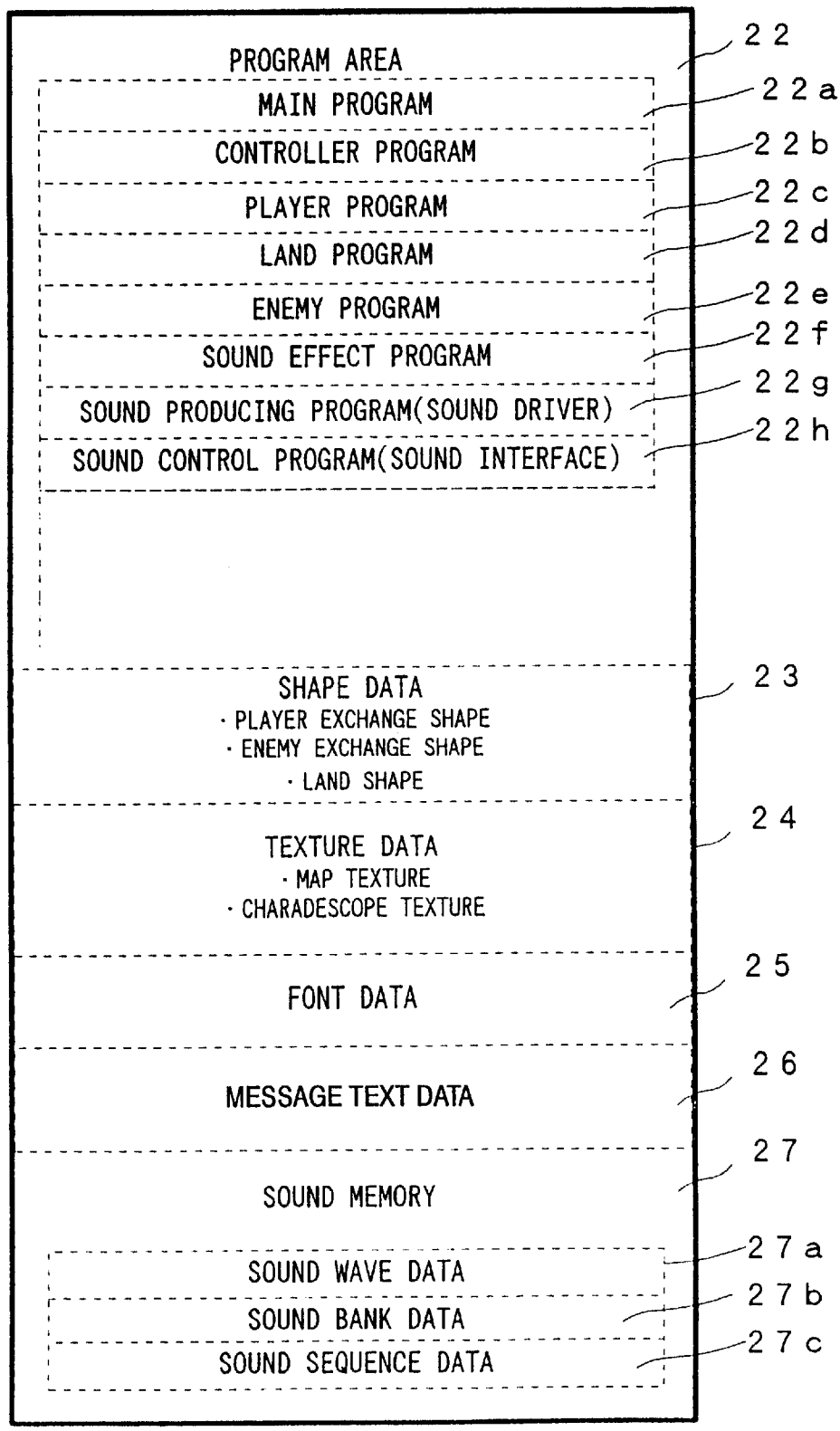
FIG. 5 is an illustrative view showing a memory map of an external ROM of FIG. 2.

FIG. 5 is a memory map illustrating a memory space of an external ROM 21 incorporated in the game cartridge 20 (FIG. 1). The external ROM 21 includes a plurality of memory areas (which may be hereinafter referred merely to as "area"), say a program area 22, shape data area 23, texture data area 24, font data area 25, message text area 26 and sound memory area 27 as shown in FIG. 5. The external ROM 21 previously stores various programs in a fixed number.

The program area 22 includes a plurality of memory areas to previously store operation programs for the CPU 11 in a fixed manner. A main program area 22a is stores a main routine processing program, such as for a game as shown in FIG. 8. A controller program area 22b stores a program to process the data to be received from the controller 40 (controller data). A player program area 22c stores a program with which the CPU 11 processes or displays a player object (an object to be operated by a player). A land program area 22d stores a program to process or display land objects (objects of the floor, land surface, stair, water surface, etc.). An enemy program area 22e stores a program to process or display enemy objects as seen from the player object. A sound effect program 22f stores a program to process sound effect data. A sound generating program area 22g stores a sound driver program. Furthermore, a sound control program area 22h stores a sound interface program.

A shape data area 23 stores a player object exchange shape, an enemy object exchange shape and a land shape, while a texture data area 24 stores map texture data and charadescope texture data. A font data area 25 stores a plurality of kinds of character codes, e.g. stores dot data for a plurality of kinds of characters corresponding to codes. A message text area 26 stores code data utilized to display an explanatory sentence to a player in the course of a game.

A sound memory area 27 includes a sound wave data area 27a, a sound bank data area 27b, and a sound sequence data area 27c.

Incidentally, with respect to the memory medium or external memory unit, various memory mediums, such as a CD-ROM or magnetic disc, are usable in place of or in addition to the game cartridge 20. In such a case, a disc drive 29 (FIG. 2) is provided in order to read, or if necessary, write various ones of data (including a program data and image displaying data) for a game from an optical or magneto-optical disc-formed memory medium, such as a CD-ROM or magnetic disc. The disc drive 29 reads out the data stored on a magnetic or optical disc with program data similar to the external ROM 21.

Figure 7A:
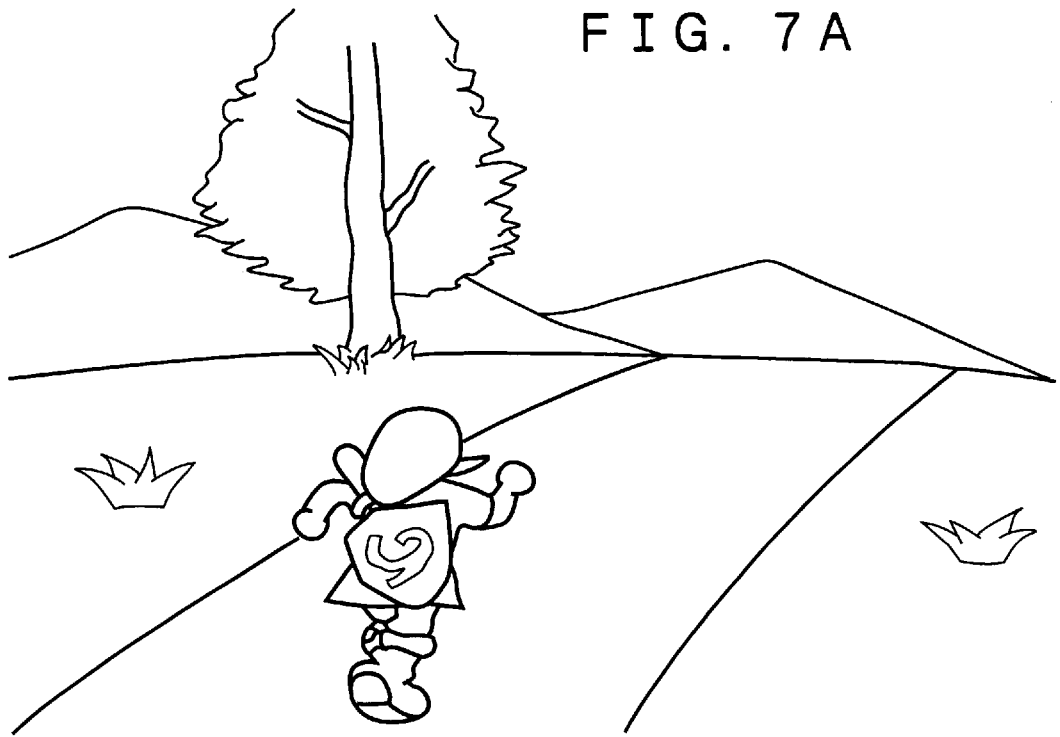
FIG. 7A is an illustrative view showing one example of a game image when the player object is moving.
Figure 7B:
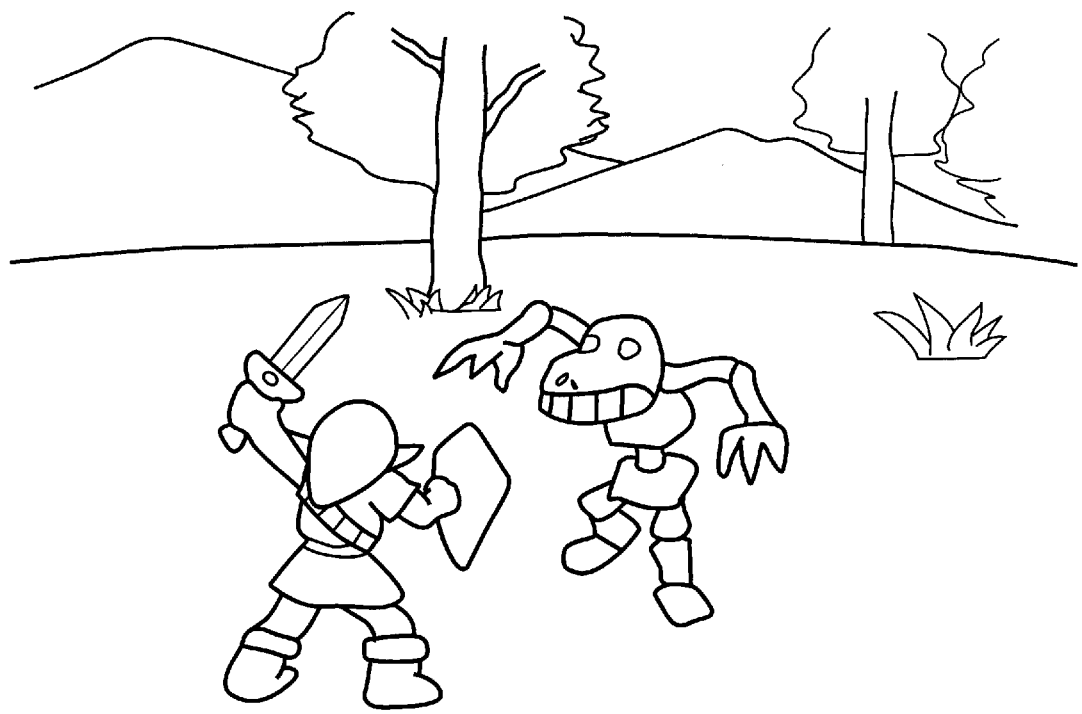
FIG. 7B is an illustrative view showing one example of a game image when the player object is fighting against an enemy object.
Figure 7C:
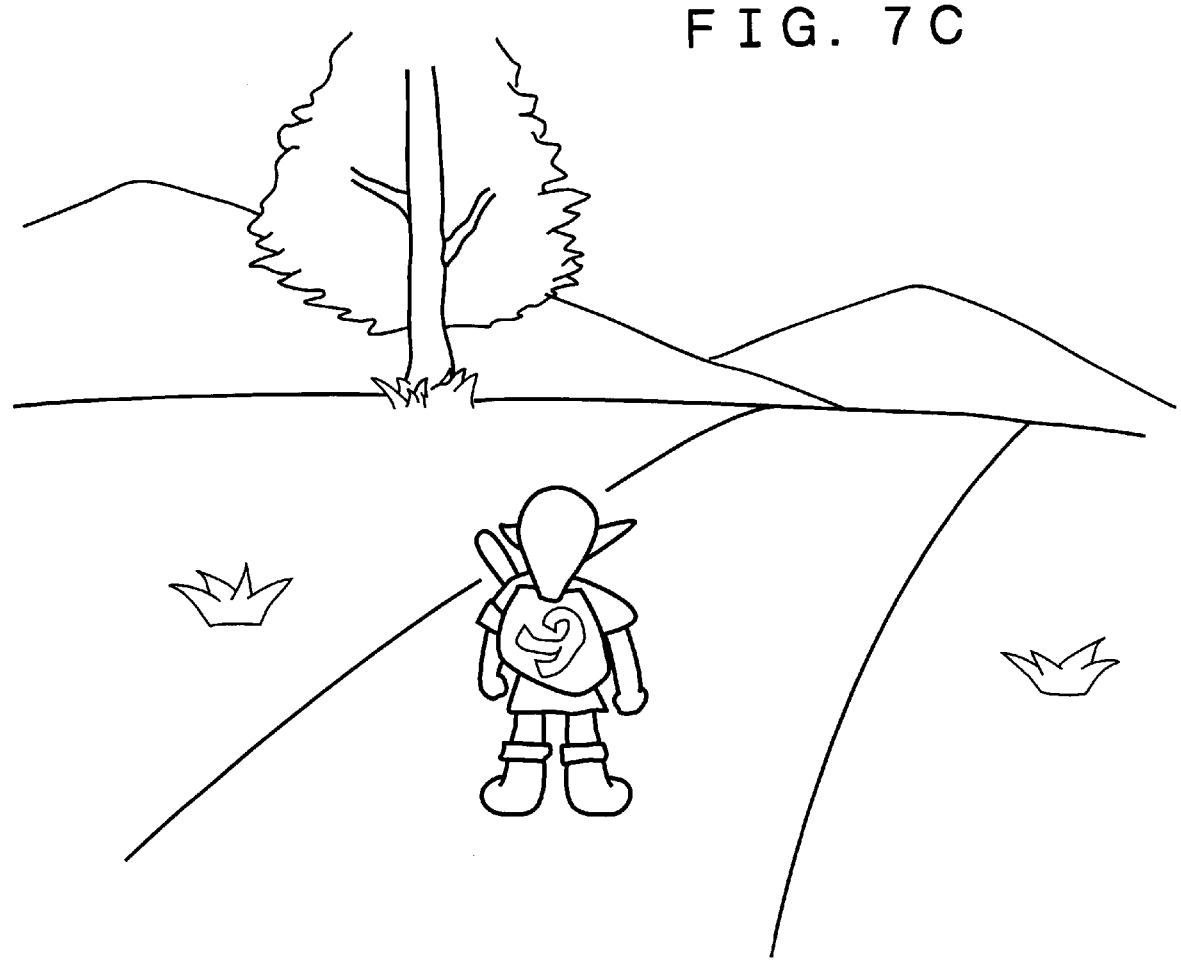
FIG. 7C is an illustrative view showing one example of a game image when the player object is stopping.

FIG. 6 demonstrates one example of sound sequence data shown in FIG. 5. The sound sequence data includes 12 block sequences having respective sequence Nos. 0–11. The sequence No. 0 is for a block management sequence. The sequence Nos. 1–5 are for block sequences to be used during movement of the player object as shown in FIG. 7A. These block sequences each consist of a melody notation including 8 measures. The sequence Nos. 6–8 are for block sequences to be used when the player object is fighting with an enemy object, each of which consists of a melody notation including 8 measures. The sequence Nos. 9–11 are for block sequences to be used when the player object is at a standstill or is stationary, each of which consists of a melody notation including 8 measures.

Figure 8A:
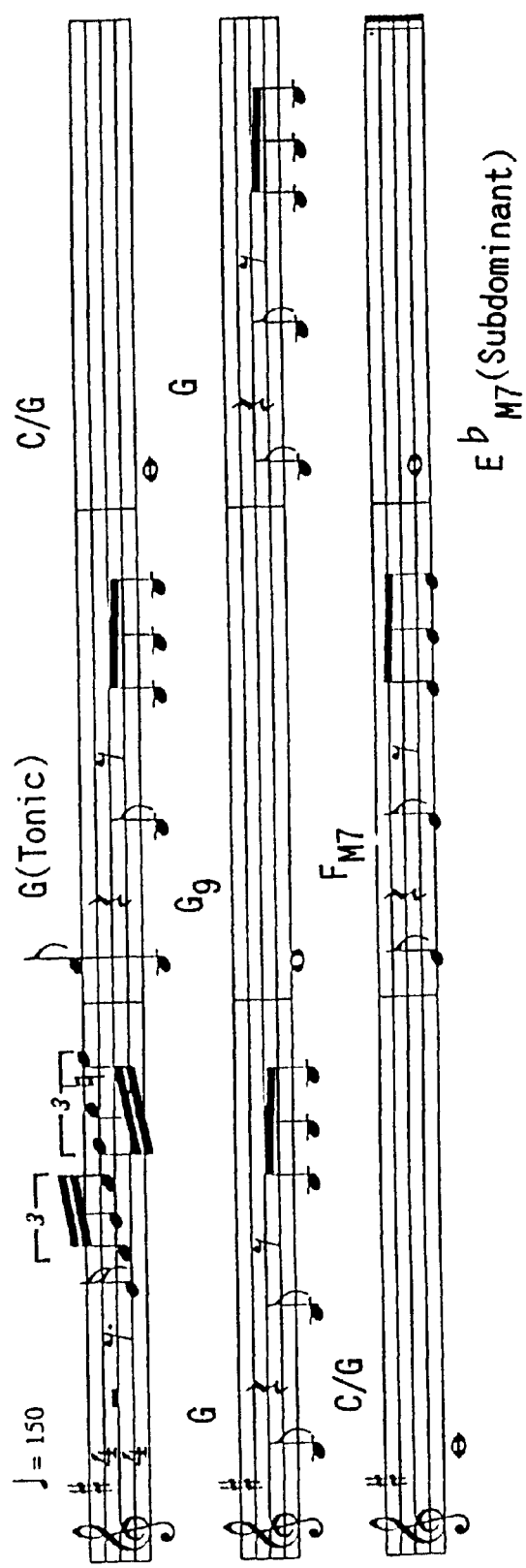
FIG. 8A is a musical notation showing one example of a move block sequence introduction.

Specifically, a move block sequence introduction is an introductory part which should be necessarily played at a beginning of a game melody. The move block sequence introduction is not played again in dependence upon a change of situation even if the player object thereafter turns into a move mode. This is because of the following reasons: (a) as shown in FIG. 8A the move block sequence introduction has one surplus beats to 8 measures as compared to that of an introduction to another mode (FIG. 9A and FIG. 10A), and cannot be properly connected to another block sequence, so that a move block sequence introduction if played delivers an impression that the melody be again started from that point, (b) although the other mode block sequence introductions are given a bridge-like role to smoothly connect the game melody under mode change, such a role is not provided to the move block sequence introduction, and (c) where the move block sequence introduction is played each time a change is made into a "move" mode, there is increased probability that an introduction to each state is played, thus making it difficult to achieve the object of the embodiment of outputting a tireless game melody. Furthermore, with respect to (b) above, the reason of not providing a bridge-like role to the block sequence introduction is due to a consideration that a move block sequence is preferably played abruptly, in order to clearly indicate to the player that a change has occurred such as the player object abruptly starting to move with a certain purpose in the case of a mode change of from a player object stoppage into movement, or in order to clearly indicate to the player a change has occurred such as an enemy having been ultimately defeated in the case of a mode change of from fighting into movement.

The move block sequences 1–4 each consist of 8 measures, and are expressed by respective musical notations as shown in FIGS. 8B–8E. The move block sequences 1–4, as will be explained hereinafter, are used to output a series of in-movement game melodies by a proper random selection after the player object turns into a move mode where the move sequence block introduction be played.

Figure 9A:
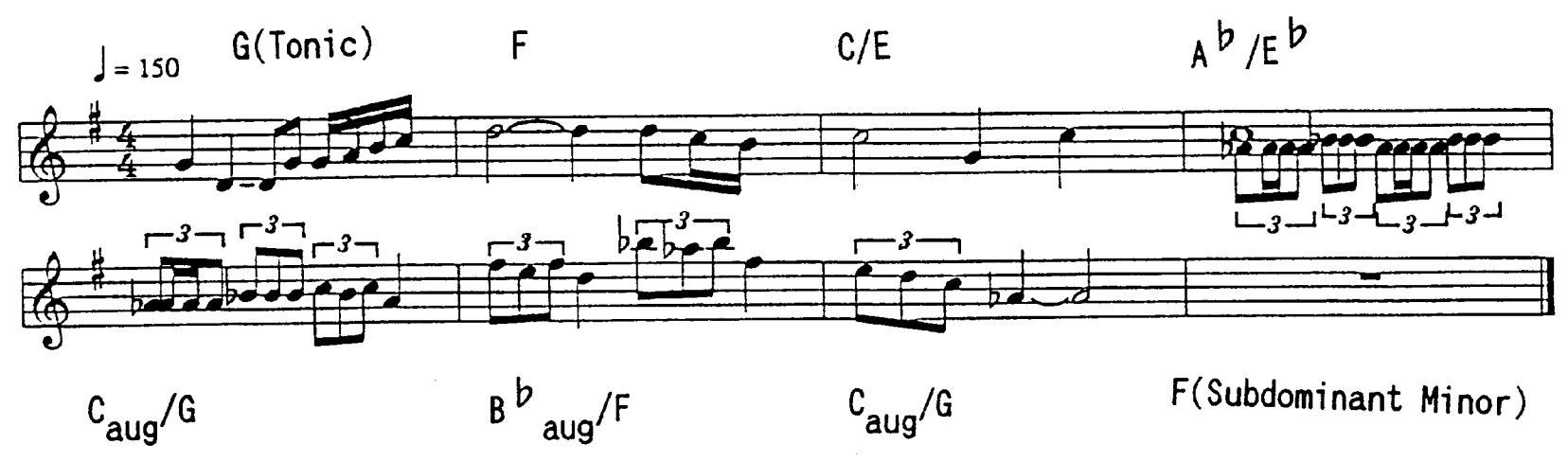

A fight block sequence introduction is an introductory part to be first played when the player object has entered into a fight mode. This fight block sequence 1 as one example is shown in FIG. 9A. The fight block sequences 1 and 2 are each consists of 8 measures and respectively expressed by musical notations as in FIGS. 9B and 9C. The fight block sequences 1 and 2, as will be explained hereinafter, are used to output a series of in-fighting game melodies through a random selection after the player object has entered into a fight mode where the fight sequence block introduction be played.

Figure 10A:
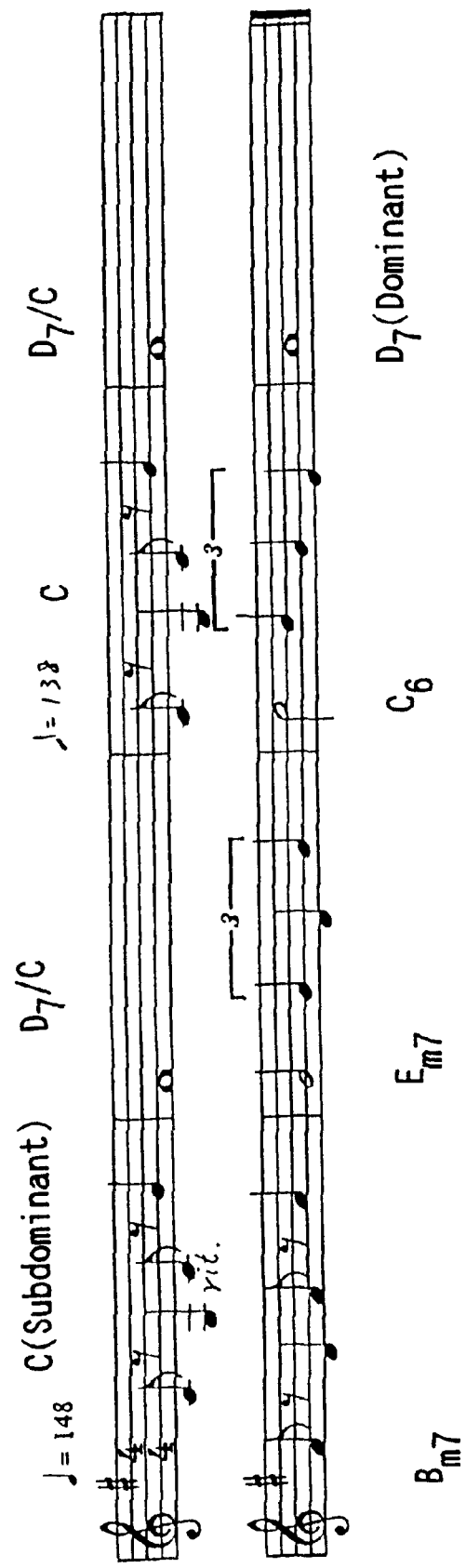
FIG. 10A is a musical notation showing one example of a stop block sequence introduction.

The stop block sequence introduction is an introductory part to be first played when the player object has entered into a stop mode. This stop block sequence 1 as one example is shown in FIG. 10A. The stop block sequences 1 and 2 each consist of 8 measures, and are respectively expressed by musical notations of FIGS. 10B and 10C. The stop block sequences 1 and 2, as will be explained hereinafter, are used to output a series of in-stoppage game melodies through an proper random selection after the player object has entered into a stop mode where the stop block sequence introduction be played.

Incidentally, because each block sequence is selected at random to be played continuously, cautions are paid to chord progression or other points in order to avoid musical mismatch feelings (i.e., a musical mismatch with respect to the game) in implementing the method.

Note that the below explained embodiments are, of course, mere examples and the block sequences to be used in an actual game will be greater in number.

(1) In each case, a same key is applied or a same keynote is consistently used without modulation.

(2) Phrases are provided, each of which has 8 measures as unit.

(3) In each mode (move, fight, stop), the same or similar rhythm is provided and the same tempo used.

(4) The fight block sequence introduction has a melody that is gradually changed within 8 measures in order to facilitate connection to another block sequence.

(5) The stop block sequence introduction also has a melody that is gradually changed within 8 measures in order to facilitate connection from another block sequence.

(6) Chord progression starts with a tonic or subdominant based chord in order to give the impression of unity from a head of the 8 measures. Here, tonic means a chord having a melody tonic chord as a center while subdominant is a chord that moves to dominant (chord strongly introducing to tonic) or tonic.

(7) The last chord is provided by a chord followed by tonic or subdominant, regardless of whether it is in a functional progression or non-functional progression. However, if ended with a tonic chord, a full cadence (melody resolution with a keynote) should be avoided.

(8) Although ending with a dominant chord is considered best, the resulting melody will be monotonous and uninteresting. Consequently, provision is made for connection in every progression.

Figure 8B:
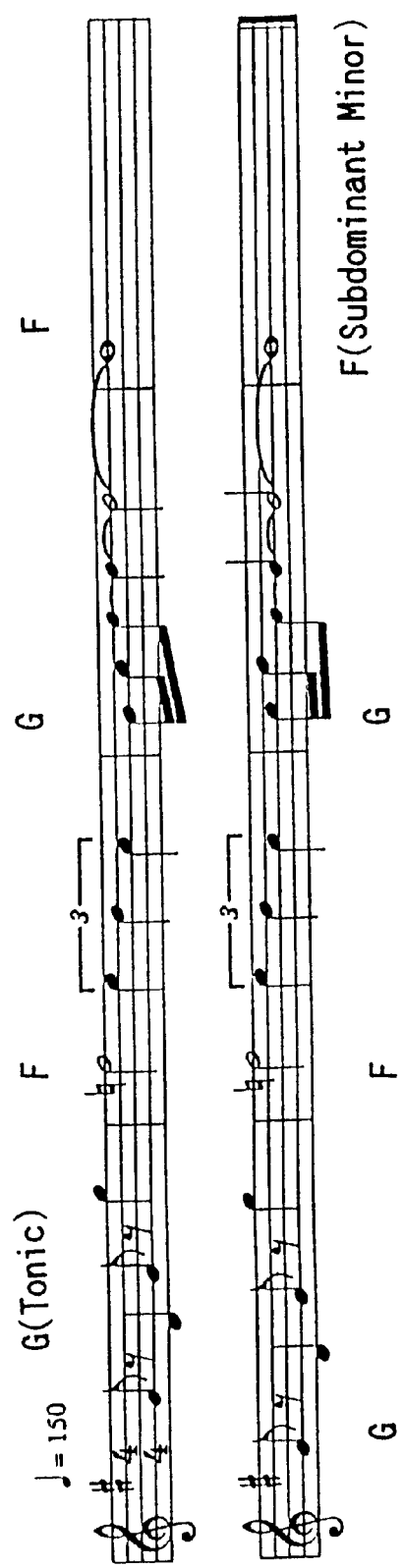
FIG. 8B is a musical notation showing one example of a move block sequence 1.
Figure 8C:
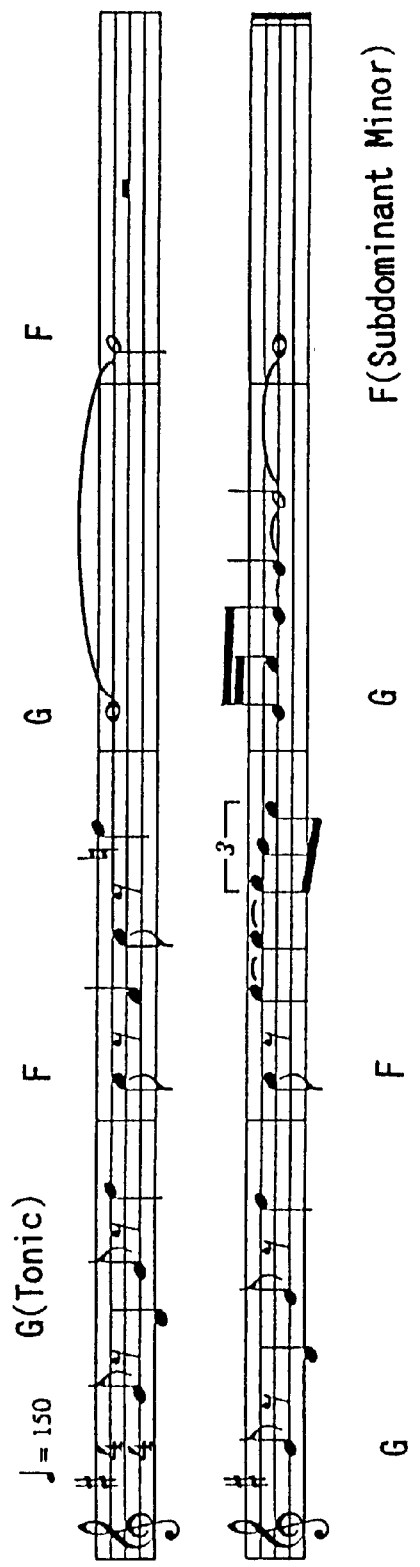
FIG. 8C is a musical notation showing one example of a move block sequence 2.
Figure 8D:
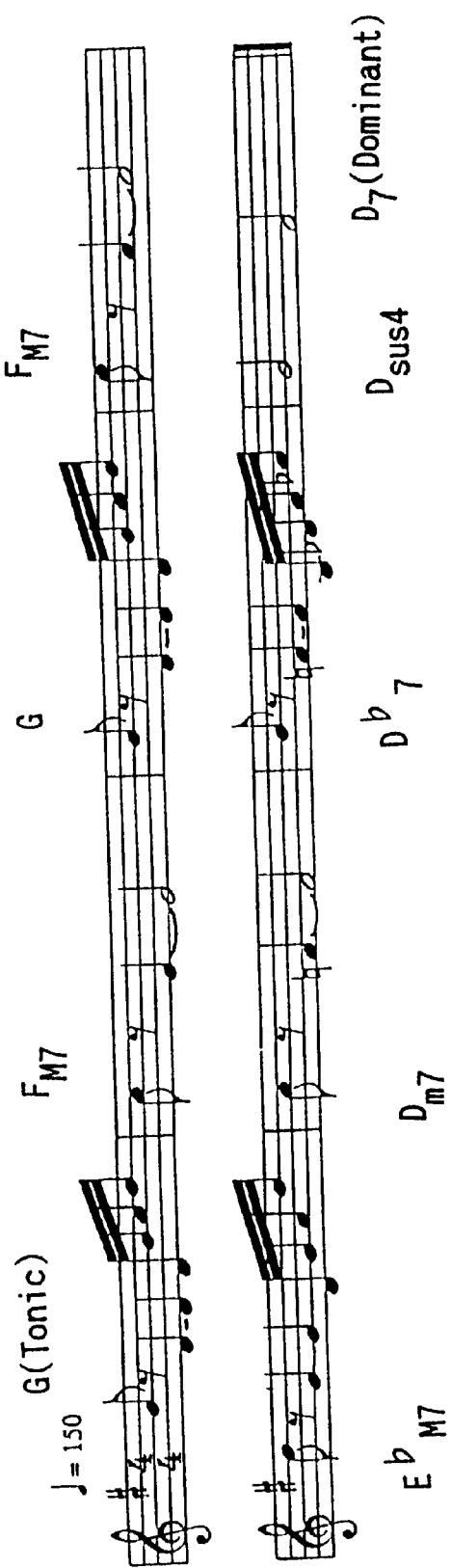
FIG. 8D is a musical notation showing one example of a move block sequence 3.
Figure 8E:
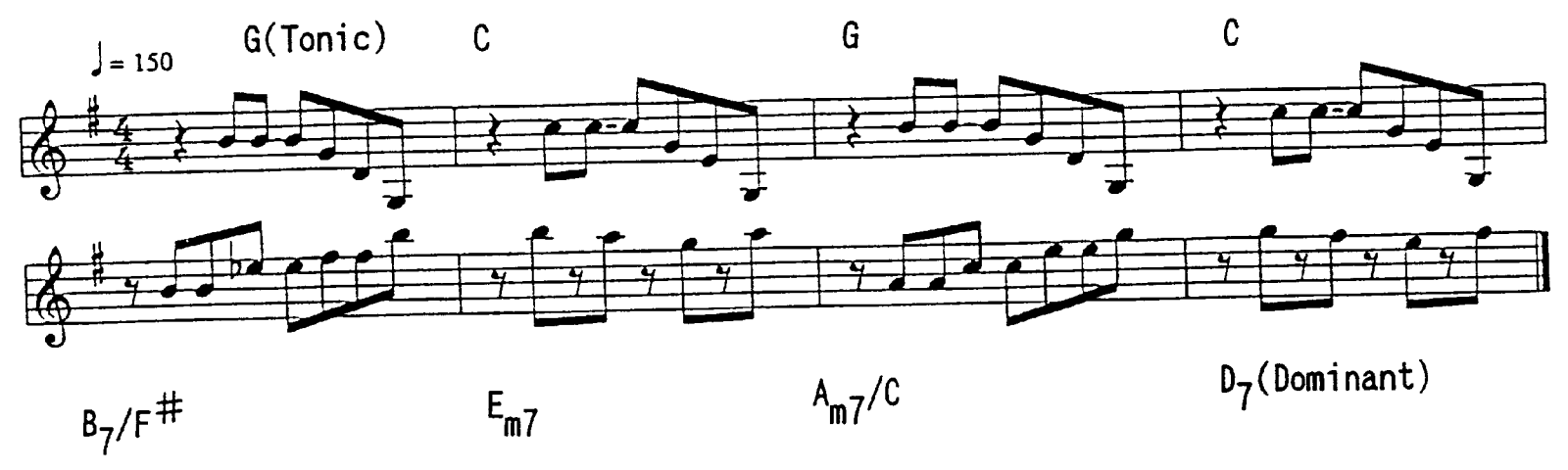

The move block sequence introduction shown in FIG. 8A has a chord progression of G (tonic)-C/G-G-G$_9$-G-C/G-F$_{M7}$/E$^b{}_{m7}$ (subdominant minor). The move block sequence 1 has a chord progression of G (tonic)-F-G-F-G-F-G-F (subdominant minor), as shown in FIG. 8B. The move block sequence 2 has a chord progression of G (tonic)-F-G-F-G-F-G-F (subdominant minor) as shown in FIG. 8G. The move block sequence 3 has a chord progression of G (tonic)-F$_{M7}$-G-F$_{M7}$-E$^b{}_{M7}$-D$_{M7}$-D$^b{}_7$-D$_{sus4}$-D$_7$ (dominant), as shown in FIG. 8D. The move block sequence 4 has a chord progression of G (tonic)-C-G-C-B$_7$/F$^\#$-E$_{m7}$A$_{m7}$/C-D$_7$ (dominant), as shown in FIG. 8E.

Figure 9B:
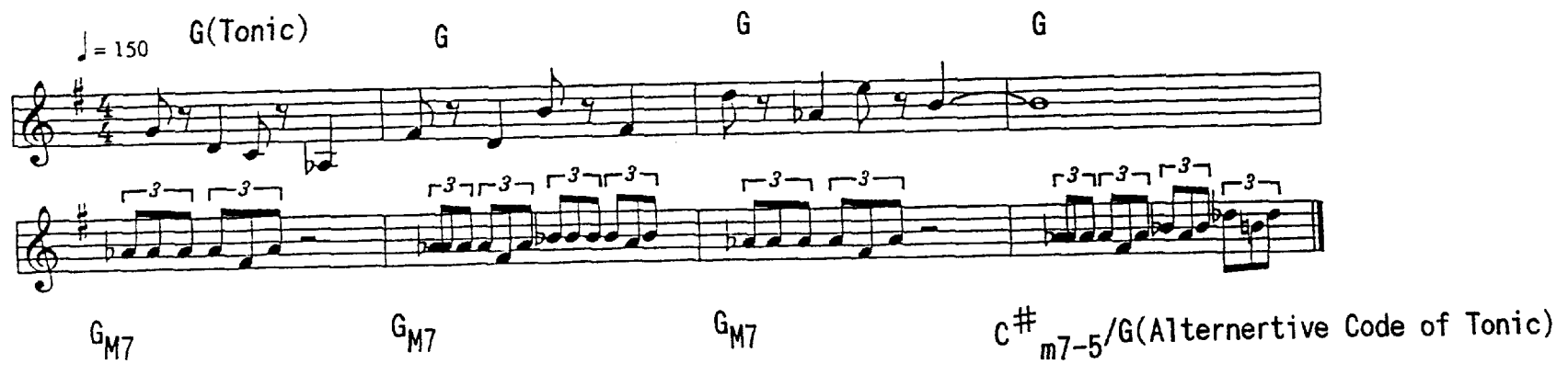
Figure 9C:
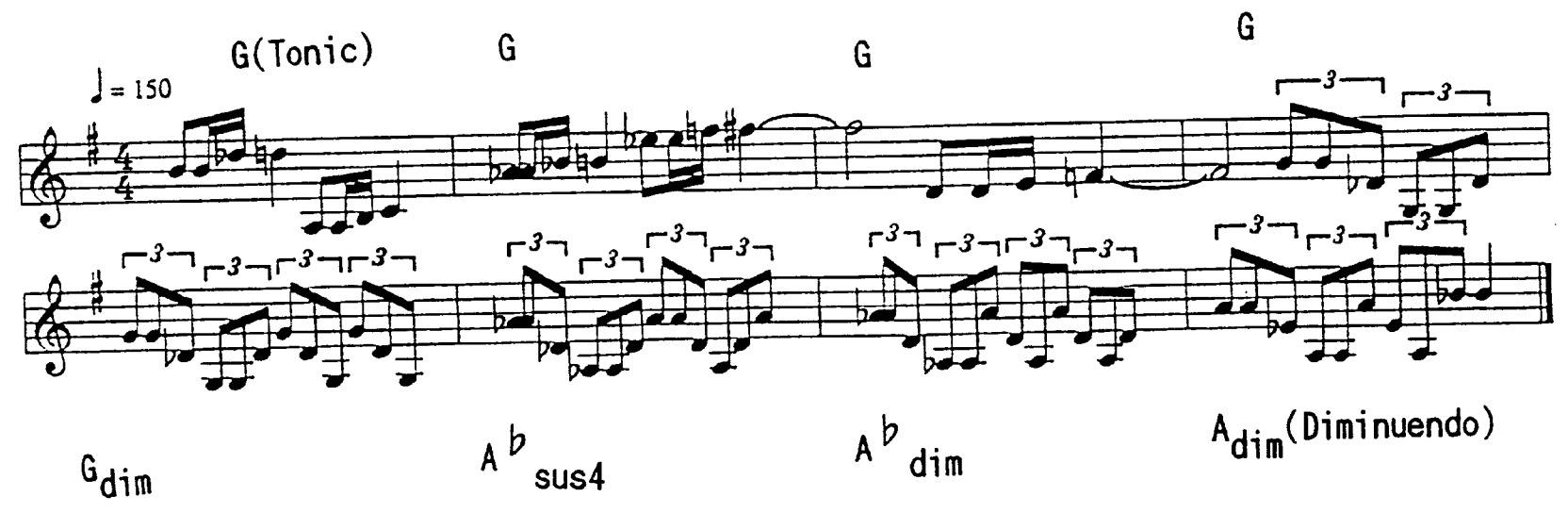

Meanwhile, the fight block sequence introduction has a chord progression of G (tonic)-F-C/E-A$^b$/E$^b$-C$_{aug}$/G-B$^b$aug/F-C$_{aug}$/G-F (subdominant minor), as shown in FIG. 9A. The fight block sequence 1 has a chord progression of G (tonic)-G-G-G-G$_{M7}$-GM7-GM7-C$^\#{}_{m7-5}$/G (tonic representative chord), as shown in FIG. 9B. The fight block sequence 2 has a chord progression of G (tonic)-G-G-G-G$_{dim}$-A$^b{}_{sus4}$-A$^b{}_{dim}$-A$_{dim}$ (diminuendo), as shown in FIG. 9B.

Figure 10C:
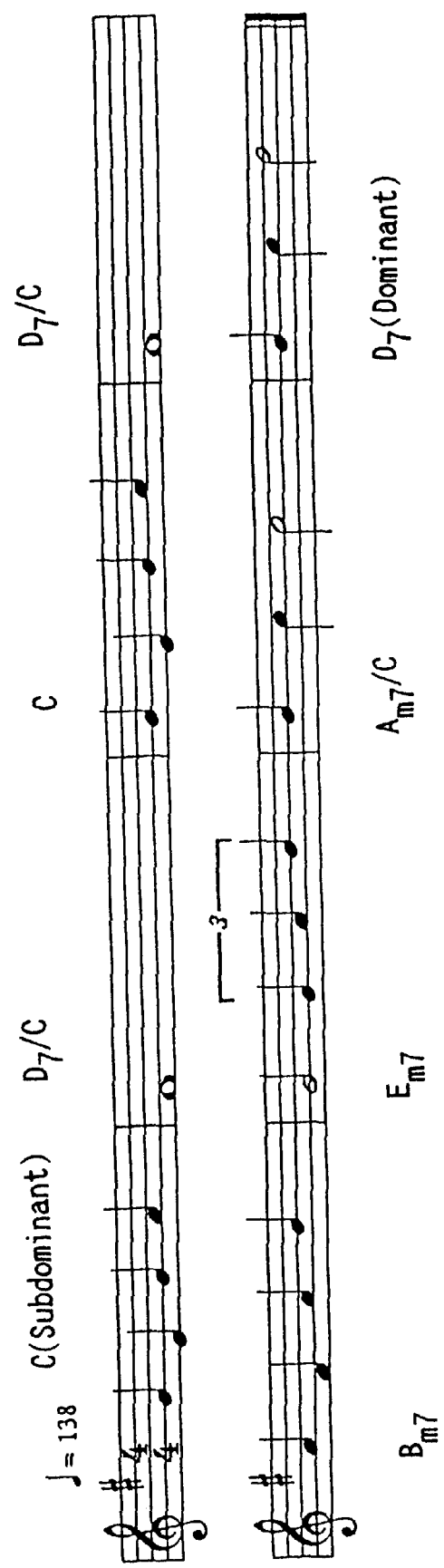
FIG. 10C is a musical notation showing one example of a stop block sequence 2.

Furthermore, the stop block sequence introduction has a chord progression of C (subdominant)-D$_7$/C-C-D$_7$/C-B$_{m7}$-E$_{m7}$-C$_6$-D$_7$ (dominant) as shown in FIG. 10A. The stop block sequence 1 has a chord progression of G (tonic)-F-C/E-C$_m$/E$^b$-G/D-A$_{m7}$-D$_{sus4}$-D7 (dominant), as shown in FIG. 10A. The stop block sequence 2 has a chord progression of C (subdominant)-D$_7$/C-C-D$_7$/C-B$_{m7}$-E$_{m7}$-A$_{m7}$/C-D7 (dominant), as shown in FIG. 10C.

Figure 11:
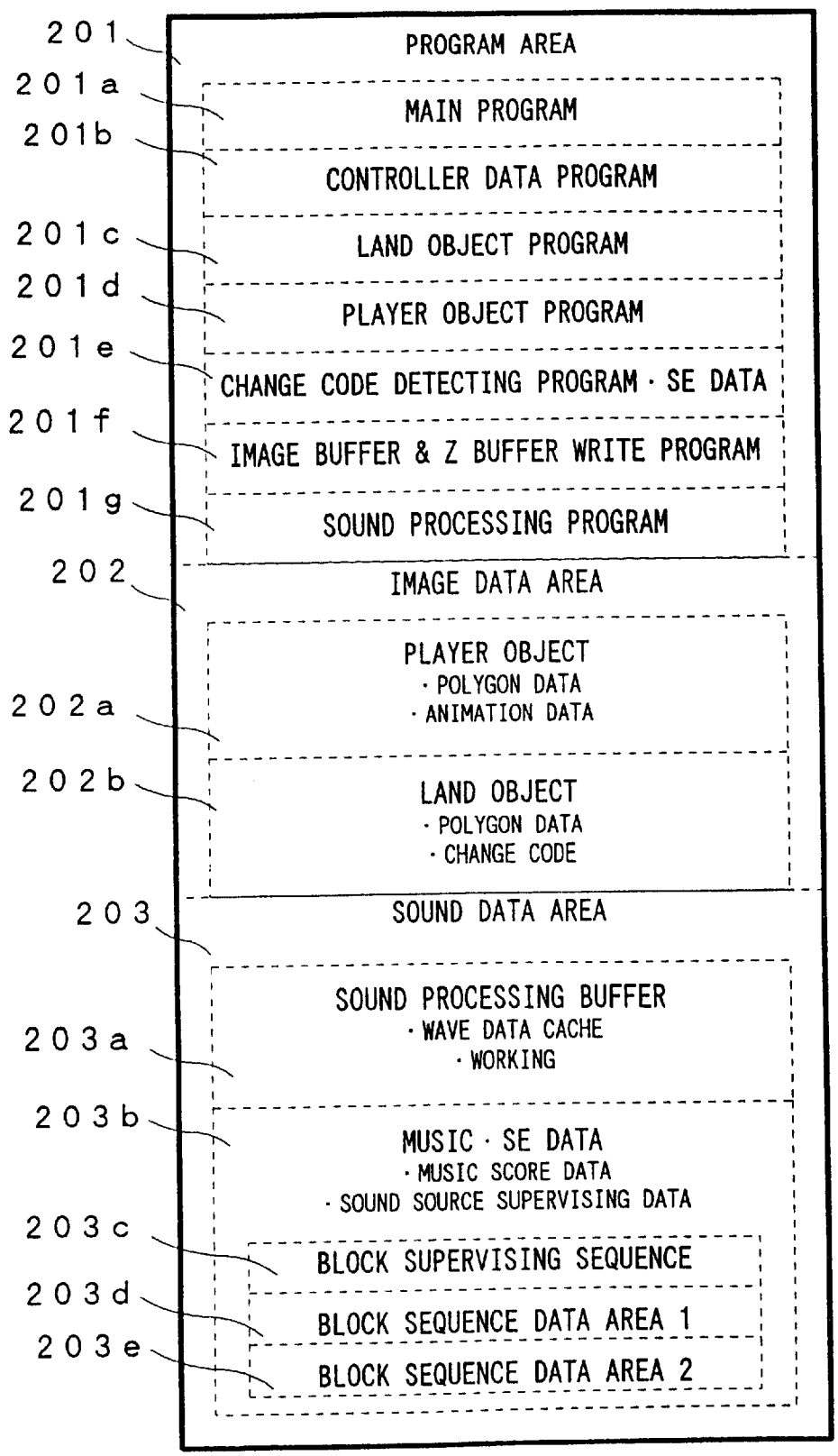
FIG. 11 is an illustrative view showing a memory map of a RAM of FIG. 2.

FIG. 11 is a memory map showing a memory space of the RAM 14. The RAM 14 includes a program area 201, image data area 202 and sound data area 203. The program data area 201 is an area to temporarily store programs. This program area 201 includes a main program area 201a, controller data program area 201b, land object program area 201c, player object program area 201d, changed-chord detection program area 201e, image buffer and Z buffer write program area 201f, and sound process program area 201g. The program data set up on each area (FIG. 5) of the ROM 21 is temporarily stored, as required, in each of the areas 201a–201g of the program data area 201. The CPU 11 and RCP 12 (FIG. 2) access the program area 201 of the RAM 14 thereby enabling the game.

Similarly, the image data area 202 (FIG. 11) temporarily stores, as required, the image data stored on the ROM 21, and can be directly accessed by the CPU 11 or RCP 12. That is, the image data area 202 stores the coordinate data and texture data for a plurality of polygons for constituting a stationary object and/or movable object which is stored on the external ROM 21 for game image display. Course or stage of data is transferred to the image data area from the external ROM 21 prior to image processing operations. The image data area 202 further includes, as shown in FIG. 11, a player object image data area 202a and land object image data area 201b. Each of the areas 202a and 202b temporarily stores polygon data, animation data or changed codes for each object.

The sound data area 203 includes a sound processing buffer area 203a and a melody SE data area 203b. The sound processing buffer area 203a is utilized as a waveform data cache and working memory. The melody SE data area 203b is utilized to temporarily store melody data and sound source supervising data. That is, this area 203b includes an area 203c to read in a block supervising sequence (FIG. 6) from the external ROM 21 upon outputting a game melody, and areas 203d and 203e to read in block sequences (FIG. 6) in order from the external ROM 21.

Figure 12:
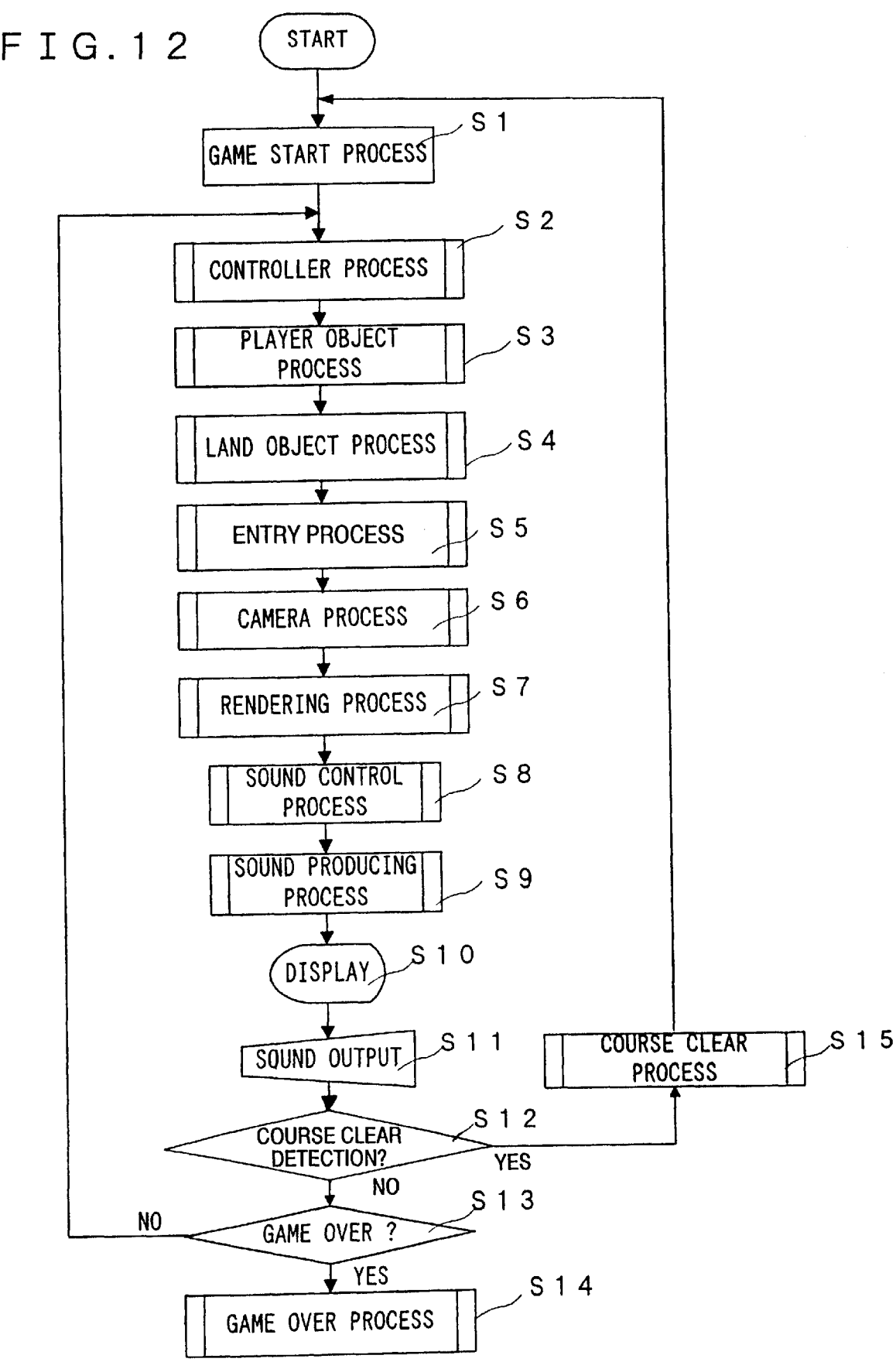
FIG. 12 is a flowchart showing an overall operation in the FIG. 1 embodiment.

FIG. 12 is a main flowchart for the video game system of this embodiment. If the power is turned on, the CPU 11 at a start sets, in a first step 1, the video game machine 10 to a predetermined initial state. For example, the CPU 11 transfers a starting program of among the game programs stored in the program area 22 of the external ROM 21 to the program area 201 of the RAM 14, and sets each parameter to an initial value, followed by execution of the steps of FIG. 12.

The operation of the main flowchart of FIG. 12 is executed, for example, every frame (1/60 second) or every 2 or 3 frames. Accordingly, the game image is rewritten once per 3 frames. That is, in this embodiment, 1 frame corresponds to 3 video frames. However, 1 game frame may correspond to 1 video frame, 2 video frames or 4 video frames.

In this main routine, the steps S1–S12 are repeatedly executed until the course has been cleared. If the game becomes over without a success of course clear, a game over process is performed in step S14 following the step S13. If course clear is successfully done, the process returns from step S12 to step S1.

That is, in the step S1, a game course screen and/or course selecting screen is displayed. However, if the game is started after turning on the power, a first course screen is displayed. If the first course is cleared, a next course is put into setting.

Following the step S1, in step S2 a controller process is performed. In this process, it is detected whether any of the joystick 45, the cross switch 46, and the switches 47A–47Z was operated. The detected data (controller data) on an operation state is read in, so that the controller data thus read is written onto the controller data area (not shown) of the RAM 14.

In step S3, a process is performed to display a player object. Specifically, in this process, the player object is moved depending upon the following: an operation state of the joystick 45 or cross key 46 operated by a player, a program transferred from the memory area 22c (FIG. 5) of the external ROM 21, player object polygon data transferred from the memory area 24, and the controller data, say the operation state of the joystick 45 or cross key 46. Otherwise, the player object is changed in motion depending on an operation state of the controller buttons 47 of the controller 40 (controller data), and polygon data to be changed is determined by calculation. A plurality of polygons obtained are colored according to texture data.

Figure 13:
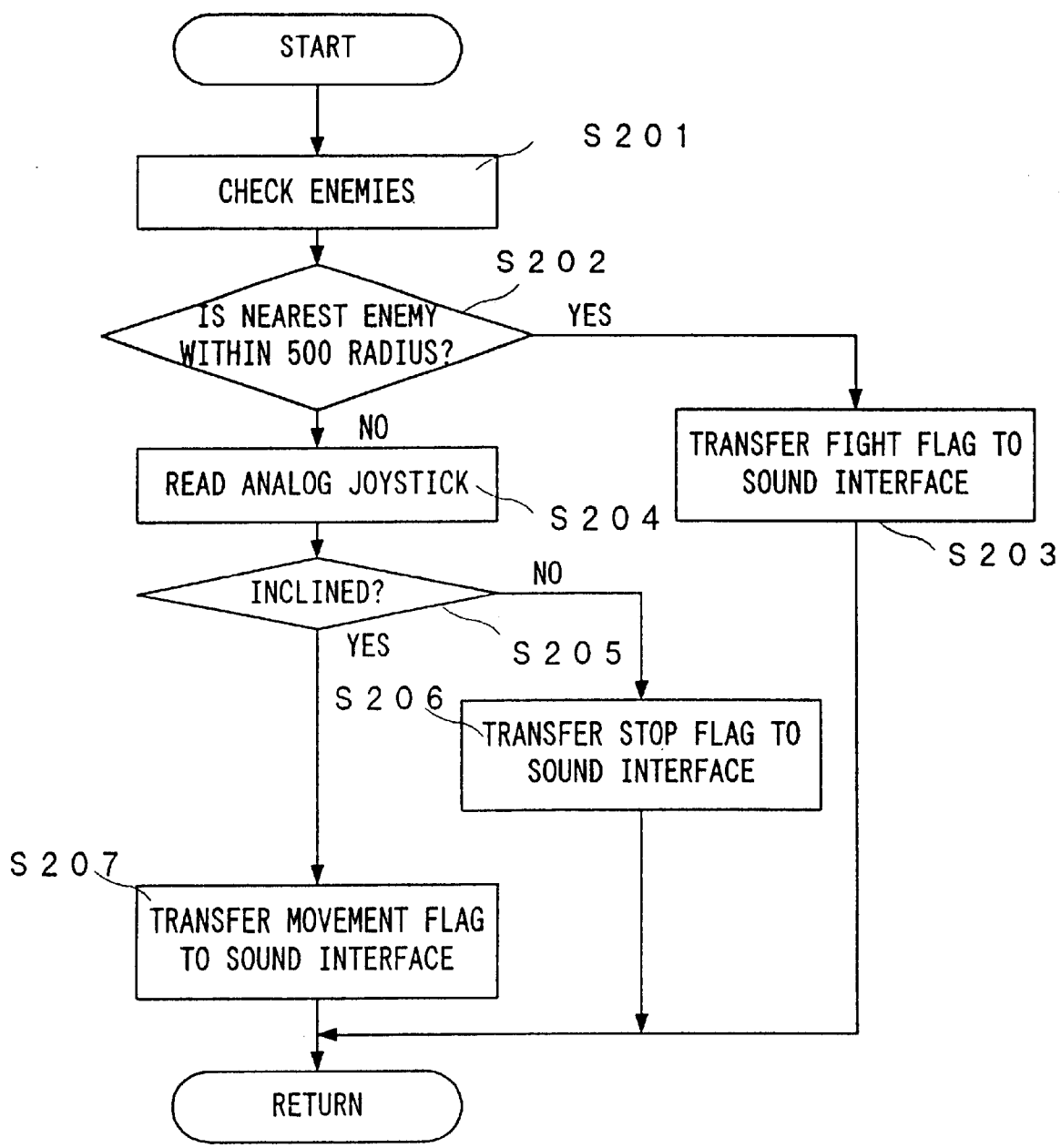
FIG. 13 is a flowchart showing in detail an action mode flag creating routine.

Incidentally, in this step S3 an action mode flag creating process is also performed as shown in FIG. 13.

In step S4, a land object process is performed. In this step, the display position or shape of a land object is calculated based on the program partly transferred from the memory area 22d and the polygon data for the land object transferred from the memory area 23 (FIG. 5).

In step S5, an entry process is performed. That is, in this step S5, the player object and land object processed as above and other objects are entered on a display list.

In step S6, a camera process is carried out. For example, each object is calculated as a point of coordinate of gaze such that a line or field of sight as viewed through a camera viewfinder is at an angle designated through the joystick 45 by the player. The position (point of gaze) or direction of the line of sight of a virtual camera is basically controlled through the joystick 45.

In step S7, the RSP 122 carries out a rendering process. That is, the RCP 12 performs, under the control of CPU 11, a transformation process (coordinate transformation and game memory rendering) on the image data to display each object based on the object texture data stored on the image data area 203 of the RAM 14.

Specifically, two-dimensional bit map image data is created for each object by taking a virtual camera position into consideration (i.e. by distinguishing between visible and invisible portions) based on three-dimensional coordinate data of a plurality of polygons for constituting the object. The texture data is to designate what color, pattern or material feeling is put to on the inside of a triangle defined by polygon three-dimensional coordinate data. If putting an eye on one dot of an bit map image, the texture data is color data. That is, the texture data is converted into color data. Thus, the bit map image color data, on each dot, is written to the frame memory, while the depth data thereof is provided to the Z buffer. In this manner, the coordinate transformation and rendering processing is made for each polygon whereby it is possible to display in two dimensions the player object and other objects (including an enemy object, stationary object, direction indicative mark, marker, etc.) existing in a virtual three-dimensional space.

In step S8 of FIG. 12, the CPU 11 performs a sound control process based on sound data, such as a message, melody, effect sound or the like. In particular, in this step S8, an option mode flag is processed as shown in FIG. 14.

Figure 15A:
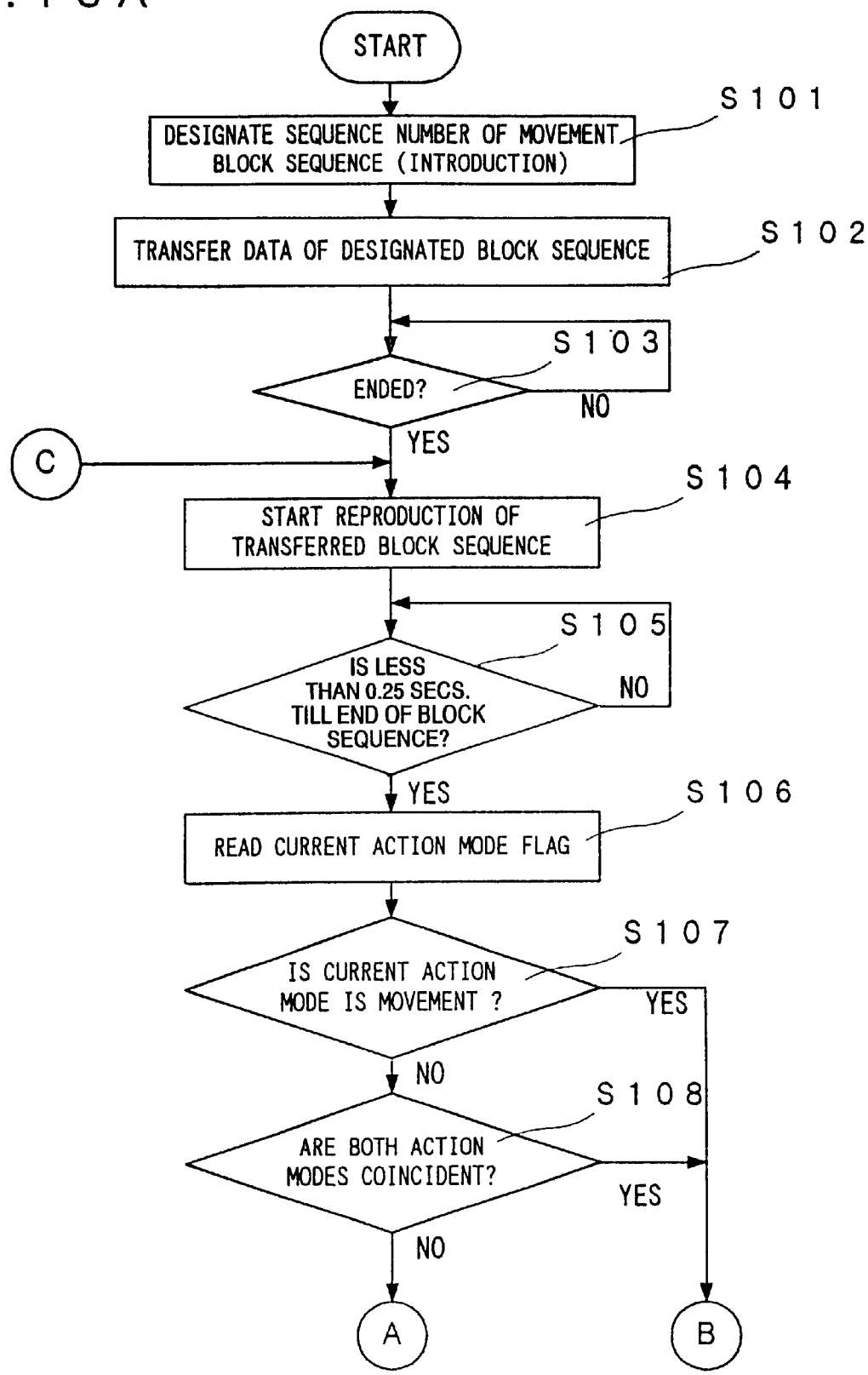
FIG. 15A and FIG. 15B are flowcharts showing in detail a sound generating process routine in the FIG. 12 embodiment.
Figure 15B:
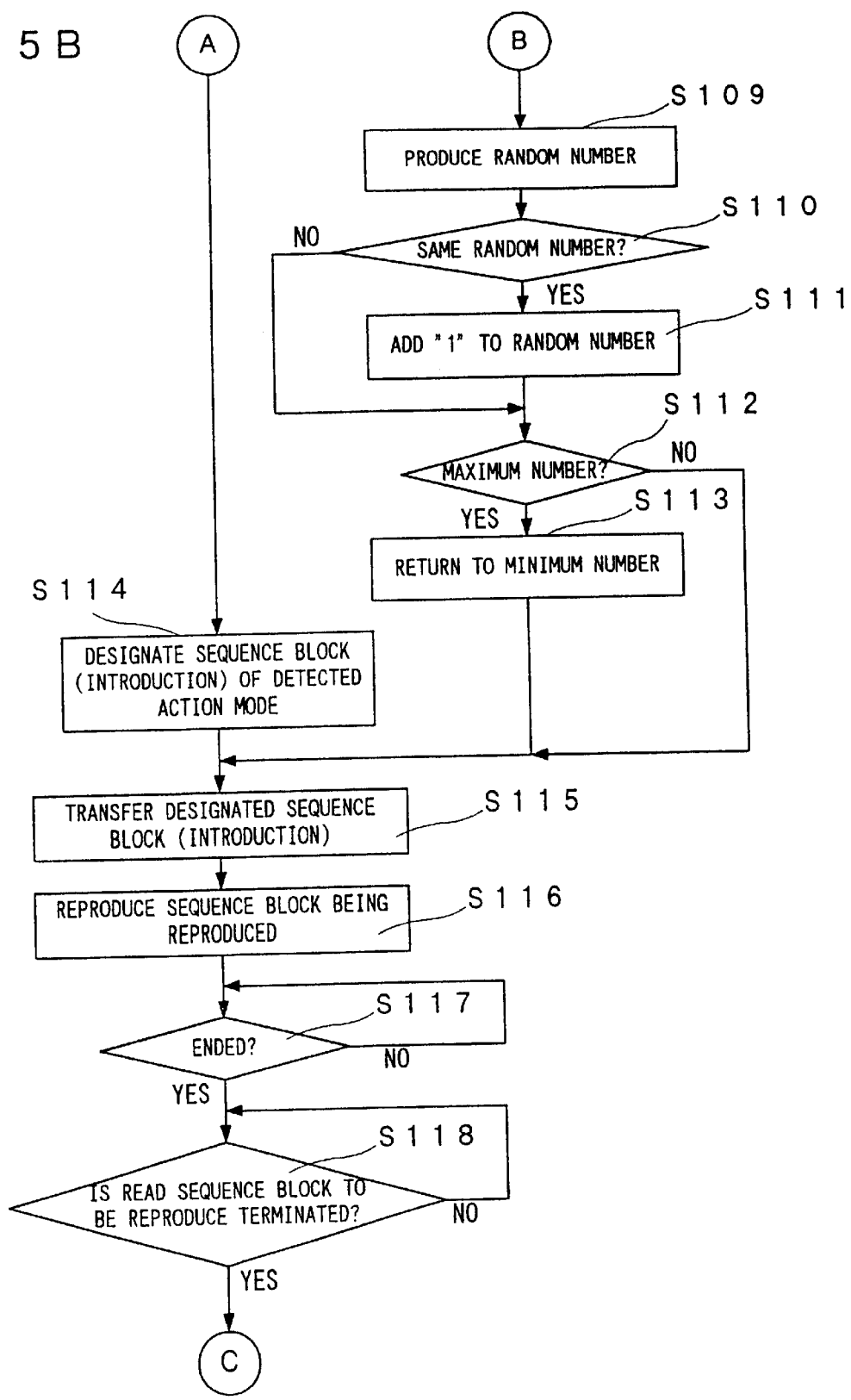

In step S9, a game melody producing process is executed as shown in FIGS. 15A and 15B. Incidentally, although the main routine of FIG. 12 is executed every 2–3 video frames as stated before, this step S9 is preferably executed once per video frame. This is because the execution of every 2–3 video frames results in the increase in the number of block sequences to be read from the ROM 21 onto the RAM 14 as will be described hereinafter. This requires an increased RAM 14 capacity. In contrast, the execution of every video frame requires a reduced number of block sequences to be read in. This, in turn, suppresses the need for the RAM 14 memory capacity to be increased. In order to execute the step S9 for every video frame in this manner, this step S9, i.e. a flowchart routine shown in FIGS. 15A and 15B, may be set, for example, as a timer interrupt routine.

In step S10, the CPU 11 reads out the image data stored in the frame memory area of the RAM 14 by the rendering process in the step S7. Consequently, the player object or other objects existing in the virtual three-dimensional space are displayed on a game screen of the display 30 (FIG. 1).

In step S11, the RCP 12 reads out the sound data obtained as a result of the sound processing in the step S10, thereby outputting sound such as a melody, sound effect or conversation.

In step S12, it is determined whether the course is cleared or not (course clear detection). If the course is not cleared, it is determined in step S13 whether the game is over or not. If the game is not over, the process returns to the step S2 whereby the steps S2–S12 are repeated until a condition of game over is detected. If a game over condition is met, i.e. the number of mistakes permitted for the player becomes a predetermined number or the life of the player object is consumed by a predetermined amount, then a game over process, such as the selection of game continuation or storing backup data, is carried out in the succeeding step S14.

Incidentally, if a condition of clearing the course (e.g. defeating a boss, etc.) is detected in the step S12, a course clear process is executed in step S15 and then the process returns to the step S1.

Referring to FIG. 13, the flowchart of FIG. 13 shows an operation of the CPU 11 to determine which mode of "move", "fight", and "stop" the player object falls under in the player object process of the step S3 of FIG. 12. In the first steps S201 and S202 of this determination routine, the CPU 11 first determines whether there exists an enemy around the player object (e.g., within a radius 500 about the player object as a center) or not. This determination can be easily implemented by comparing a coordinate of the player object (two or three dimensional) and a coordinate of an enemy object (two or three dimensional).

If "YES" is determined in the step S202, the CPU in step S203 reads a "fight flag" out of the area 22h of the external ROM 21 and writes it onto a predetermined address of the RAM 14 to which a sound interface is stored in the area 201g of the RAM 14. Due to this, it is known that the player object is in a fight state.

If "NO" is determined in the step S202, the CPU 11 in step S204 makes reference to a state of the analog joystick 45 (FIG. 1, FIG. 4) (direction and degree of inclination). It is determined in step S205 whether the analog joystick 45 is inclined or not. When the analog joystick 45 is not inclined, that is, when "NO" is determined in step S205, then the CPU 11 in step S206 determines the player object is in a "stopped" state, and writes a "stop flag" to the predetermined address of the RAM 14 to which the sound interface program refers as mentioned above. Due to this, it is known that the player object is in a "stopped" state.

If "YES" is determined in the step S205, that is, if the analog joystick 45 is inclined, then the CPU 11 in step S207 determines that the player object is moving, and writes a "move flag" to a predetermined address of the RAM 14 to which the sound interface program refers. Due to this, it is known that the player object is in a movement state.

In this manner, a state of the player object is detected in the player object process in the step S3. This detected state (mode flag) of the player object is preferably used as it is to reflect in real time the change of game image for a game melody. However, the block sequence consists of 8 measures, as stated before. Accordingly, the timing in which the game melody is switched over is on the basis of 8 measures. On the other hand, this embodiment adopts a method to previously read only the block sequences, which are required for reproducing a game melody at a current time, into the sound data area of the RAM 14. Accordingly, there is a necessity to read block sequences in accordance with the player object action mode before switching over the game melody. Due to this, it is difficult to output a game melody in complete agreement with the change in player object situation. In particular, the problem lies in the processing to be made for the player object to be stopped. Accordingly, a previously detected mode flag is processed in a preferred embodiment according to a flowchart shown in FIG. 14.

In the first step S301 of FIG. 14, the CPU 11 determines whether the action mode detected in the player object process step is "stop" or not. If "NO" is determined, the action mode is, "move" or "fight", and accordingly, in step S302 the CPU 11 sends a same flag as that of the detected action mode, i.e. a "move flag" or "fight flag", to the sound interface. That is, when the action mode is not "stop", the "move flag" or "fight flag" that was set in FIG. 13 is sent as it is.

However, if "YES" is determined in the step S301, that is, when the flag set in FIG. 13 was a "stop flag", the CPU 11 in the step S303 determines whether the "stop flag" remains for not less than 1.5 seconds or not. This time of 1.5 seconds corresponds to a time for which the game image can be rewritten 30 times on the display 30 such as a CRT, i.e. a 90-frame time period (for the case of 3 video frames corresponding to 1 game frame).

If "NO" is determined in this step S303, that is, if the player object stop time is shorter than 1.5 seconds, the CPU 11 neglects this stop state and determines in the step S304 that player object is in movement, and sends a "move flag" to the sound interface program. If, for example, the player object unexpectedly stops only when a block sequence is being read, "move" is adopted as an action mode, thus achieving a switch in game melody in a natural way.

Conversely, if "YES" is determined in the step S303, that is, if the player object stop time is longer than 1.5 seconds, it is determined that the player object has completely stopped. The CPU 11 in step S305 sends a "stop flag" to the sound interface program.

After the action mode flag has been created and processed in this manner, a game melody is reproduced or outputted according to the flowchart shown in FIGS. 15A and 15B. This game melody output routine is started by loading a block administrating sequence (sequence No. 0 in FIG. 6) for performing sound basic processing onto the area 103c (FIG. 11) of the RAM 14 and giving a play start command to the sound driver read to the RAM area 201g from the external ROM area 22g by the CPU 11. That is, the routine of FIGS. 15A and 15B is started by loading a block administrating sequence from the external ROM 21 onto the sound data area 203 of the RAM 14 and providing a start command to the sound driver.

In the first step S101 of FIG. 15A, CPU 11 designates a sequence number of the "move block sequence introduction" as an introduction to a game melody, i.e. sequence No. 1 of FIG. 6. In the next step S102, the CPU 11 reads the "move block sequence introduction" into the block sequence area 203d shown in FIG. 5. If the reading of the block sequence is ended in the step S103, the CPU 11 in step S104 delivers a command to the sound driver. Consequently, the playing of a melody is started from its head measure according to a musical notation of the "move block sequence introduction" shown in FIG. 8A which has been read into the block sequence area 103d.

Thereafter, the CPU 11 in step S105 detects whether the time before ending the play of "moving block sequence introduction" was less than 0.25 seconds or not. Although block sequence reading by its nature is completely instantly, it is carried out simultaneously with the transfer of other data for game processing. Accordingly, an allowance time should be given to the read-in time. Due to this allowance time, in this embodiment a block sequence to be next reproduced is determined 0.25 second before ending the currently reproduced block sequence, according to an action mode flag.

That is, a determination is made 0.25 second before the CPU 11 in the next step S106 reads a current action mode flag for the player object. Then, the CPU 11 in step S107 determines whether the current action mode flag is "move" or not. This is because that the "move block sequence introduction" has been designated in the first step S101. If "YES" is determined in this step S107, the process advances to step S109 in FIG. 15B.

If "NO" is determined in the step S107, then it is determined in step S108 whether two action mode flags, i.e. the flag for being currently played and the current player object flag, are coincident or not. The action mode flag of the player object in this case is, of course, a flag as was explained in FIG. 14. If "YES" is determined in the step S108, the process proceeds to step S109. If "NO" is determined, the process proceeds to step S114 in FIG. 15B.

In the step S109, the CPU 11 produces a random number. In step S110, the CPU 11 determines whether the random number produced in the step S109 is the same as the random number last produced or not. If they are the same, then in step S111 the produced random number is added by "1" in order to avoid a mismatched feeling of continuously playing the same block sequence. Thereafter, the process advances to step S112 after step S111 is completed or in the case of "NO" being determined in the step S110. In this step S112, the CPU 11 determines whether the produced random number or the random number added by "1" is a maximum value (in the embodiment, "4" for the movement block sequence and "2" for other e.g., fight, stop block sequences) or not. If "YES" is determined in this step S112, the CPU 11 in step S113 sets a minimum value (in the embodiment "1" for any mode). In this manner, a block sequence to be played next is selected at random.

On the other hand, if "NO" is determined in the step S108, the process advances to step S114. In this step S114, an introduction part to an action mode detected in the step S106 is designated as the block sequence to be reproduced next. That is, either a "fight block sequence introduction" or a "stop block sequence introduction" is selected.

Alternatively, if the steps S109–S113 are completed, the block sequence to be reproduced next is a block sequence with a sequence No. set at random.

In either the case where an introduction part is selected in the step S114, or where another block sequence is selected after the step S113 is completed, in the next step S115, the musical notation data of the selected block sequence is read into the block sequence data area 203a shown in FIG. 8. In step S116, the read block sequence is reproduced until its end is detected in step S117. If the end is detected in the step S117, it is determined in step S118 whether there still exists the read-in block sequence or not. If "YES" is determined, the process returns to the step S104 mentioned above.

Figure 16A:
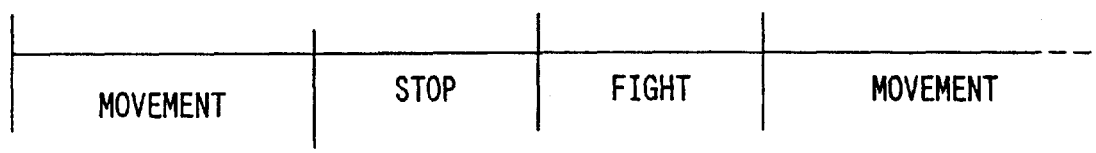
FIG. 16 is an illustrative view showing one example of in relationship between a player object action mode and a block sequence to be played.
Figure 16B:
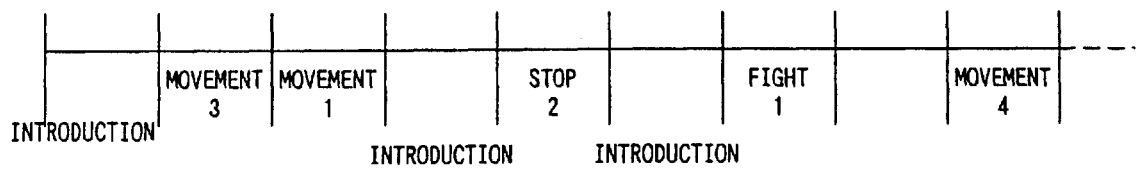

In the embodiment shown in FIG. 13 to FIG. 15B, where the player object action mode changes as shown in FIG. 16(A), a block sequence shown in FIG. 16(B) is selected and reproduced in order. In this case, the player object is changed from a fight mode into a move mode. Upon this change, no move sequence introduction is played as was explained before, and thereafter a move block sequence 4 is played. In the move mode, however, a move block sequence introduction may be played similarly to other modes. Where the action mode flag of FIG. 17 changes as in FIG. 16, a part of a series of game melodies to be reproduced or outputted using block sequences is concretely shown in FIG. 8A to FIG. 10C.

In the above embodiment the sound memory area is previously set on the external ROM. Such a memory medium may use an arbitrary memory medium including a DVD-ROM, hard disc having program data downloaded from a communication line, RAM, ZIP, etc.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video game apparatus which displays on a display, according to a game program, game images including a player object and outputs a game melody in relation to the game images, comprising:

a memory medium for fixedly storing said game program, said memory medium storing a plurality of block sequences to constitute a game melody each of which consists of a plurality of measures, each of said plurality of block sequences having head and last measures that provide a musical continuation between two arbitrary block sequences put in continuation;

a RAM;

a selecting means for selecting at least one by one said plurality of block sequences;

a read means for reading one or more selected block sequences to said RAM; and an output means for outputting a game melody based on the one or more block sequences read in said RAM, said read means selecting a block sequence before ending a block sequence being outputted by said outputting means.

2. A video game apparatus according to claim 1, further comprising a state detecting means for detecting an action state of said player object, wherein said plurality of block sequences includes two or more state-basis block sequences for each different action state of said player object, said selecting means selecting one of said state-basis block sequences belonging to an action state detected by said state detecting means.

3. A video game apparatus according to claim 2, wherein said action state of said player object includes at least "move" and "stop", said state detecting means detecting said "move" state when said "stop" state does not remain for a predetermined time period and longer.

4. A video game apparatus according to claim 3, further comprising a state change detecting means for detecting a change in said action state of said player object, wherein each of said state-basis block sequences includes an introduction sequence, and when a state change is detected by said state change detecting means, said selecting means selects an introduction sequence for said state-basis sequence.

5. A video game apparatus according to claim 4, wherein said selecting means does not select an introduction sequence for said "move" state when said object is changed in action state from said "stop" state or a "fight" state to said "move" state.

6. A video game apparatus according to claim 4, wherein said at least one of state-basis block sequences includes three or more block sequences while said introduction sequences are included for each action state, said selecting means including a random selecting means to select at random two or more block sequences not including said introduction sequences.

7. A video game apparatus according to claim 6, wherein said random selecting means includes a random number generating means to generate a random number.

8. A video game apparatus according to claim 7, wherein said random selecting means further includes a means to process a random number when a random number produced by said random number generating means is the same as the random number previously generated the last time.

9. A video game apparatus according to claim 8, wherein said random selecting means further includes a means to forcibly set a minimum value when a random number processed by said means to process has a numerical value corresponding to a maximum number of said block sequences.

10. A video game apparatus according to claim 7, wherein said random selecting means further includes a means to forcibly set a minimum value and a random number produced by said random number generating means is a numerical value corresponding to a maximum number of said block sequences.

11. A video game apparatus which displays on a display, according to a game program, game images including a player object and outputs a game melody in relation to the game images, comprising:

a memory medium for fixedly storing said game program, said memory medium storing a plurality of block sequences to constitute a game melody each of which consists of a plurality of measures, each of said block sequences having head and last measures that provide a musical continuation for two arbitrary block sequences put in continuation; and a game melody output means for outputting a series of game melodies by reading different ones of said block sequences out of said memory medium and connecting them depending upon a predetermined condition related to said player object.

12. A memory medium to be attached, upon use, to a video game apparatus which displays on a display, according to a game program, game images including a player object and outputs a game melody in relation to said game images, comprising:

a first memory area for storing a plurality of block sequences to constitute said game melody each of which consists of a plurality of measures, each of said block sequences having head and last measures that provide a musical continuation for two block sequences put in continuation;

a second memory area for storing a select program for selecting at least one of said block sequences;

a third memory area for storing a read program to read in a RAM one or more of said selected block sequences; and a fourth memory area for storing an output program to output a game melody based on said block sequences read in said RAM, a block sequence being selected according to said select program before ending a block sequence being outputted by said output program.

13. A video game apparatus which displays on a display, according to a game program, game images including a player object and outputs a game melody in relation to the game images, comprising:

a memory medium for fixedly storing said game program, said memory medium storing a plurality of block sequences to constitute a game melody each of which includes a plurality of measures, each of said plurality of block sequences having head and last measures that provide a continuation of music between two arbitrary block sequences put in continuation;

a RAM;

a selector for selecting at least one by one said plurality of block sequences;

a reader for reading one or more selected block sequences to said RAM; and an output for outputting a game melody based on the one or more block sequences read in said RAM, said reader selecting a block sequence before ending a block sequence being outputted by said output.

14. A video game apparatus accordingly to claim 13, further comprising a state detector for detecting an action state of said player object, wherein said plurality of block sequences includes two or more state-basis block sequences for each different action state of said player object, said selector selecting one of said state-basis block sequences belonging to an action state detected by said state detector.

15. A video game apparatus according to claim 14, wherein said action state of said player object includes at least "move" and "stop", said state detector detecting said "move" state when said "stop" state does not remain for a predetermined time period and longer.

16. A video game apparatus according to claim 15, further comprising a state change detector for detecting a change in said action state of said player object, wherein each of said state-basis block sequences includes an introduction sequence, and when a state change is detected by said state change detector, said selector selects an introduction sequence for said state-basis sequence.

17. A video game apparatus according to claim 16, wherein said selector does not select an introduction sequence for said "move" state when said object is changed in action state from said "stop" state or a "fight" state to said "move" state.

18. A video game apparatus according to claim 16, wherein at least one of said state-basis block sequences includes three or more block sequences while said introduction sequences are included for each action state, said selector including a random selector to select at random two or more block sequences not including said introduction sequences.

19. A video game apparatus according to claim 18, wherein said random selector includes a random number generator to generate a random number.

20. A video game apparatus according to claim 19, wherein said random selector further includes a processor to process a random number when a random number generated by said random number generator is the same as the random number previously generated the last time.

21. A video game apparatus according to claim 20, wherein said random selector further includes a minimum value setter that sets a minimum value when a random number processed by said processor has a numerical value corresponding to a maximum number of said block sequences.

22. A video game apparatus according to claim 19, wherein said random selector further includes a minimum value setter that sets a muimum value and a random number generated by said random number generator is a numerical value corresponding to a maximum number of said block sequences.

23. A video game apparatus which displays on a display, according to a game program, game images including a player object and outputs a game melody in relation to the game images, comprising:

a memory medium for fixedly storing said game program, said memory medium storing a plurality of block sequences to constitute a game melody each of which includes a plurality of measures, each of said block sequences having head and last measures that provide a musical continuation for two arbitrary block sequences put in continuation; and a game melody output for outputting a series of game melodies by reading different ones of said block sequences out of said memory medium and connecting them depending upon a predetermined condition related to said player object.

24. A memory medium to be attached, upon use, to a video game apparatus which displays on a display, according to a game program, game images including a player object and outputs a game melody in relation to said game images, comprising:

a first memory area for storing a plurality of block sequences to constitute said game melody each of which includes a plurality of measures, each of said block sequences having head and last measures that provide a musical continuation for two block sequences put in continuation;

a second memory area for storing a select program for selecting at least one of said block sequences;

a third memory area for storing a read program to read in a RAM one or more of said selected block sequences; and a fourth memory area for storing an output program to output a game melody based on said block sequences read in said RAM, a block sequence being selected according to said select program before ending a block sequence being outputted by said output program.

* * * * *